United States Patent
Ohno et al.

(10) Patent No.: US 9,679,244 B2
(45) Date of Patent: Jun. 13, 2017

(54) METHOD FOR PREDICTING QUALITY OR MANUFACTURING CONDITION OF CEMENT

(71) Applicant: TAIHEIYO CEMENT CORPORATION, Tokyo (JP)

(72) Inventors: Maiko Ohno, Sakura (JP); Daisuke Kurokawa, Sakura (JP); Hiroshi Hirao, Sakura (JP)

(73) Assignee: TAIHEIYO CEMENT CORPORATION, Tokyo (JP)

(*) Notice: Subject to any disclaimer, the term of this patent is extended or adjusted under 35 U.S.C. 154(b) by 386 days.

(21) Appl. No.: 14/403,753

(22) PCT Filed: Feb. 22, 2013

(86) PCT No.: PCT/JP2013/054623
§ 371 (c)(1),
(2) Date: Nov. 25, 2014

(87) PCT Pub. No.: WO2013/179702
PCT Pub. Date: Dec. 5, 2013

(65) Prior Publication Data
US 2015/0186772 A1 Jul. 2, 2015

(30) Foreign Application Priority Data
May 30, 2012 (JP) .................. 2012-123654

(51) Int. Cl.
*G06E 1/00* (2006.01)
*G06E 3/00* (2006.01)
(Continued)

(52) U.S. Cl.
CPC .............. *G06N 3/08* (2013.01); *C04B 7/361* (2013.01); *G06F 17/18* (2013.01)

(58) Field of Classification Search
CPC combination set(s) only.
See application file for complete search history.

(56) References Cited

U.S. PATENT DOCUMENTS

| 8,133,317 B2* | 3/2012 | Hirao | C04B 28/02 106/705 |
| 2009/0151604 A1* | 6/2009 | Hirao | C04B 28/02 106/705 |
| 2015/0186772 A1* | 7/2015 | Ohno | G06N 3/08 706/21 |

FOREIGN PATENT DOCUMENTS

| JP | H03-83155 A | 4/1991 |
| JP | H05-250164 A | 9/1993 |

(Continued)

OTHER PUBLICATIONS

Ann, Arima and Ma timeseries model for forecasting in cement manufacturing industry: Case study at lafarge cement Indonesia—Aceh Edy Fradinata; Sakesun Suthummanon; Nikorn Sirivongpaisal; Wannarat Suntiamorntuthq 2014 Intl Conf of Advanced Informatics: Concept, Theory and Application (ICAICTA) pp. 39-44, IEEE.*

(Continued)

*Primary Examiner* — Michael B Holmes
(74) *Attorney, Agent, or Firm* — Posz Law Group, PLC

(57) ABSTRACT

Provided is a method capable of predicting the quality of cement in a short time period and with high accuracy. The method of predicting the quality or manufacturing conditions of cement through use of a neural network including an input layer and an output layer includes: performing learning of the neural network for a sufficiently large number of times of learning such that $\sigma_L < \sigma_M$ is obtained, using learning data and monitor data; then repeating the learning of the neural network until $\sigma_L \geq \sigma_M$ is obtained while the number of times of learning is decreased; inputting specific observation data (Continued)

to the input layer of the neural network in which a judgment value for analysis degree obtained from the neural network after the learning is less than a preset value; and outputting an estimated value of specific evaluation data from the output layer of the neural network.

8 Claims, 14 Drawing Sheets

(51) Int. Cl.
    *G06F 15/18*     (2006.01)
    *G06G 7/00*     (2006.01)
    *G06N 3/08*     (2006.01)
    *C04B 7/36*     (2006.01)
    *G06F 17/18*     (2006.01)

(56) References Cited

FOREIGN PATENT DOCUMENTS

| | | |
|---|---|---|
| JP | 2005-214891 A | 8/2005 |
| JP | 2007-271448 A | 10/2007 |

OTHER PUBLICATIONS

A comparative study of black-box models for cement quality prediction using input-output measurements of a closed circuit grinding Luis I. Minchala-Avila; Manuel Reinoso-Avecillas; Christian Sánchez; Alfredo Mora; Marcelo Yungaicela; Jean P. Mata-Quevedo 2016 Annual IEEE Systems Conference (SysCon) Year: 2016 pp. 1-7, IEEE.*

Forecasting of machining quality using predictive neural networks Lijohn P George; J Edwin Raja Dhas; Satheesh M 2015 International Conference on Control, Instrumentation, Communication and Computational Technologies (ICCICCT) Year: 2015 pp. 204-207, DOI: 10.1109/ICCICCT.2015.7475276 IEEE Conference Publications.*

Comprehensive Evaluation for Industry Economic Power of Mining Cities Based on Nonlinear Mathematical Model Ya-cui Gao 2011 International Conference on Management and Service Science Year: 2011 pp. 1-4, DOI: 10.1109/ICMSS.2011.5998400 IEEE Conference Publications.*

International Preliminary Report on Patentability and Written Opinion of the International Searching Authority mailed on Dec. 2, 2014 for the corresponding international application No. PCT/JP2013/054623 (English translation).

* cited by examiner

METHOD FOR PREDICTING QUALITY OR MANUFACTURING CONDITION OF CEMENT

CROSS REFERENCE TO RELATED APPLICATIONS

The present disclosure is a U.S. national stage application of PCT/JP2013/054623 filed on Feb. 22, 2013, and is based on Japanese Patent Application No. 2012-123654 filed on May 30, 2012, the contents of which are incorporated herein by reference.

TECHNICAL FIELD

The present invention relates to a method of predicting the quality or manufacturing conditions of cement through use of a neural network.

BACKGROUND ART

Hitherto, there has been a problem in that it takes a cost and time to evaluate the quality of cement. For example, the compressive strength of mortar is measured by kneading cement, standard sand, and water in accordance with JIS R 5201 to mold a test piece and setting the test piece onto a compression tester at each time after curing for 1 day, curing for 3 days, curing for 7 days, and curing for 28 days. That is, it takes 28 days to determine a measurement result of the compressive strength of mortar, and hence a predicted value of the compressive strength of mortar cannot be obtained before shipping of cement.

In particular, in the recent cement manufacturing, the usage amount of industrial waste serving as a cement raw material or fuel for burning is increasing, and it is considered that there is an increase in the opportunity to change the quality of cement. Therefore, in order to prevent the abnormality of the quality of cement to be shipped, the importance of managing the quality of cement is increasing.

In order to solve the above-mentioned problem, Patent Literature 1 discloses a method of predicting the quality of cement involving analyzing a powder X-ray diffraction result of cement or clinker by a profile fitting method, and predicting a change in quality of cement (specifically, setting time period of cement and compressive strength of mortar) based on the crystal information of clinker mineral obtained from the analysis.

Further, Patent Literature 2 discloses a method of estimating the quality of cement involving applying information on the amounts of clinker constituent mineral and additives in cement, information on the crystal structure of the clinker constituent mineral, information on the amounts of minor components of clinker, and information on the fineness and 45 μm residue of cement, which are collected as quality management information in the operation of a cement manufacturing plant, to an estimation formula of the compressive strength of mortar determined based on multiple regression analysis among those information accumulated in the past and the actually measured data on the compressive strength of mortar, thereby estimating the compressive strength of mortar.

However, according to the methods of Patent Literatures 1 and 2, the qualities (for example, the fluidity of mortar, etc.) other than compressive strength and setting time period of mortar cannot be predicted. Further, the factors that influence the quality of cement are not limited to those disclosed in Patent Literatures 1 and 2, and various factors such as various conditions in a manufacturing process are considered to be involved in a complicated manner. Therefore, it has not been considered that the methods of Patent Literatures 1 and 2 have high accuracy.

On the other hand, a plurality of factors such as the flow rate of gas of a preheater are involved in some of the manufacturing conditions of cement in a complicated manner, as in the hydraulic modulus of a clinker raw material immediately before loading into a kiln, and hence it is difficult to predict some of the manufacturing conditions.

Then, there is a demand for a method capable of predicting the quality or manufacturing conditions of cement in a short time period and with high accuracy, taking various factors into consideration.

CITATION LIST

Patent Literature

[Patent Literature 1] JP 2005-214891 A
[Patent Literature 2] JP 2007-271448 A

SUMMARY OF INVENTION

Technical Problem

It is an object of the present invention to provide a method capable of predicting the quality or manufacturing conditions of cement in a short time period and with high accuracy.

Solution to Problem

The inventors of the present invention earnestly conducted studies so as to solve the above-mentioned problem and found that the method described below can achieve the above-mentioned object, thereby achieving the present invention. The method includes performing learning of a neural network for a sufficiently large number of times of learning such that $\sigma_L < \sigma_M$ (the meaning of this expression is described later) is obtained by using learning data and monitor data, then repeating the learning of the neural network until $\sigma_L \geq \sigma_M$ is obtained while the number of times of learning is decreased, inputting specific observation data in an input layer of the neural network when a judgment value for analysis degree is less than a preset value, and outputting an estimated value of specific evaluation data from an output layer of the neural network.

Specifically, the present invention provides Items [1] to [7] below.

[1] A method of predicting quality or manufacturing conditions of cement through use of a neural network including an input layer and an output layer, the input layer being used for inputting an actually measured value of observation data in cement manufacturing, the output layer being used for outputting an estimated value of evaluation data related to evaluation of the quality or the manufacturing conditions of the cement, the observation data and the evaluation data being used in one of the following combinations: (i) a combination in which the observation data includes one or more kinds of data selected from data on a clinker raw material, data on burning conditions, data on grinding conditions, and data on clinker, and the evaluation data includes data on a clinker raw material, data on burning conditions, data on grinding conditions, data on clinker, and data on cement; and (ii) a combination in which the observation data includes data on a clinker raw material, data on burning conditions, data on grinding conditions, data on clinker, and data on cement, and the evaluation data includes data on physical properties of a cement-containing hydraulic composite, the method including the steps of: (A) performing initial setting of a number of times of learning; (B) performing learning of the neural network for the set number of times of learning through use of a plurality of learning data each including a combination of an actually measured value of the observation data and an actually measured value of the evaluation data; (C) calculating a mean square error ($\sigma_L$) between an estimated value of the evaluation data obtained by inputting an actually measured value of the observation data of the plurality of learning data to the input layer of the neural network in which learning has been performed in the latest step (B) and an actually measured value of the evaluation data of the plurality of learning data, and a mean square error ($\sigma_M$) between an estimated value of the evaluation data obtained by inputting an actually measured value of the observation data in monitor data, which include a combination of an actually measured value of the observation data and an actually measured value of the evaluation data and are used for confirming reliability of a learning result of the neural network, to the input layer of the neural network in which learning has been performed in the latest step (B) and an actually measured value of the evaluation data in the monitor data, performing a step (D) when the calculated $\sigma_L$ and $\sigma_M$ satisfy a relationship of $\sigma_L \geq \sigma_M$ (i.e. $\sigma_L$ is equal to or more than $\sigma_M$), and performing a step (E) when the calculated $\sigma_L$ and $\sigma_M$ satisfy a relationship of $\sigma_L < \sigma_M$ (i.e. $\sigma_L$ is less than $\sigma_M$); (D) increasing the set number of times of learning to reset the increased set number of times of learning as a new number of times of learning, and performing the steps (B) and (C) again; (E) resetting a number of times of learning obtained by reducing the number of times of learning for which the latest learning of the neural network has been performed as a new number of times of learning; (F) performing the learning of the neural network for the set number of times of learning through use of the plurality of learning data used in the step (B); (G) calculating a mean square error ($\sigma_L$) between an estimated value of the evaluation data obtained by inputting an actually measured value of the observation data of the plurality of learning data to the input layer of the neural network in which learning has been performed in the latest step (F) and an actually measured value of the evaluation data of the plurality of learning data, and a mean square error ($\sigma_M$) between an estimated value of the evaluation data obtained by inputting an actually measured value of the observation data in the monitor data to the input layer of the neural network in which learning has been performed in the latest step (F) and an actually measured value of the evaluation data in the monitor data, performing a step (I) when the calculated $\sigma_L$ and $\sigma_M$ satisfy a relationship of $\Gamma_L \geq \sigma_M$, and performing a step (H) when the calculated $\sigma_L$ and $\sigma_M$ satisfy a relationship of $\sigma_L < \sigma_M$; (H) performing the steps (E) to (G) again when the number of times of learning of the neural network in the step (F) performed most recently is more than a preset numerical value, and performing a step (K) when the number of times of learning of the neural network in the step (F) performed most recently is equal to or less than the preset numerical value; (I) calculating a judgment value for analysis degree by the following equation (1), and when the analysis degree determination value is less than a preset value, inputting an actually measured value of the observation data in the cement manufacturing to the input layer and outputting an estimated value of the evaluation data related to the evaluation of the quality or the manufacturing conditions of the cement from the output layer; and (K) initializing learning conditions, and performing the steps (A) to (K) again:

$$\text{Analysis degree determination value (\%)} = \frac{\text{Mean square error } (\sigma_L) \text{ of learning data}}{\text{Average value of estimated value of evaluation data}} \times 100 \quad (1)$$

(in the equation (1), the mean square error ($\sigma_L$) of the learning data represents a mean square error ($\sigma_L$) of an estimated value of the evaluation data obtained by inputting an actually measured value of the observation data of the learning data to the input layer of the neural network after learning and an actually measured value of the evaluation data of the learning data, and the average value of the estimated value of the evaluation data represents an average value of an estimated value of the evaluation data obtained by inputting an actually measured value of the observation data of the learning data to the input layer of the neural network after learning).

[2] The method of predicting quality or manufacturing conditions of cement according to Item [1], further including, before the step (K), a step (J) of determining (i.e. judging, checking, or investigating) a number of times for which the step (A) has been performed, and when the number of times is equal to or less than a preset number of times, initializing the learning conditions and performing the steps (A) to (I) again, and when the number of times is more than the preset number of times, ending the learning of the neural network.

[3] The method of predicting quality or manufacturing conditions of cement according to Item [1] or [2], in which the preset value of the analysis degree determination value is a value equal to or less than 6%.

[4] The method of predicting quality or manufacturing conditions of cement according to any one of Items [1] to [3], in which the neural network is a hierarchical neural network including an intermediate layer between the input layer and the output layer.

[5] The method of predicting quality or manufacturing conditions according to any one of Items [1] to [4], in which, in the combination of the observation data and the evaluation data, the observation data includes the data on a clinker raw material, the data on burning conditions, and the data on clinker, and the evaluation data includes the data on clinker, and in which the data on a clinker raw material of the observation data includes a chemical composition of a clinker raw material, the data on burning conditions of the observation data includes a kiln outlet temperature of a kiln, a burning zone temperature of the kiln, and average torque of the kiln, the data on clinker of the observation data includes a chemical composition of clinker and a bulk density of clinker, and the data on clinker of the evaluation data includes a free lime content determined by wet analysis (free lime).

[6] The method of predicting quality or manufacturing conditions of cement according to any one of Items [1] to [4], in which, in the combination of the observation data and the evaluation data, the observation data includes the data on burning conditions and the data on cement, and the evaluation data includes the data on physical properties of a cement-containing hydraulic composite, and in which the data on burning conditions of the observation data includes a kiln outlet temperature of a kiln and a cooler temperature, the data on cement of the observation data includes a Blaine specific surface area of cement, a residual amount, a free lime content determined by wet analysis, a mineral composition, and a chemical composition, and the data on physical properties of a cement-containing hydraulic composite of the evaluation data includes compressive strength of mortar.

[7] The method of predicting quality or manufacturing conditions of cement according to any one of Items [1] to [6], further including optimizing the manufacturing conditions of the cement based on the estimated value of the evaluation data obtained by artificially varying a value of the observation data.

[8] The method of predicting quality or manufacturing conditions of cement according to any one of Items [1] to [7], further including periodically checking a degree of difference between the estimated value of the evaluation data and the actually measured value corresponding to the estimated value, and updating the neural network based on a check result.

Advantageous Effects of Invention

The quality or manufacturing conditions of cement can be predicted in a short time period and with high accuracy based on various data obtained in the course of cement manufacturing through use of the method of predicting quality or manufacturing conditions of cement of the present invention.

Further, the manufacturing conditions can be managed in real time based on the obtained estimated value, and the stabilization of the quality of cement can be enhanced or the manufacturing conditions of cement can be optimized.

Further, the accuracy of prediction can be enhanced by updating the neural network periodically.

DESCRIPTION OF EMBODIMENTS

Figure 1:
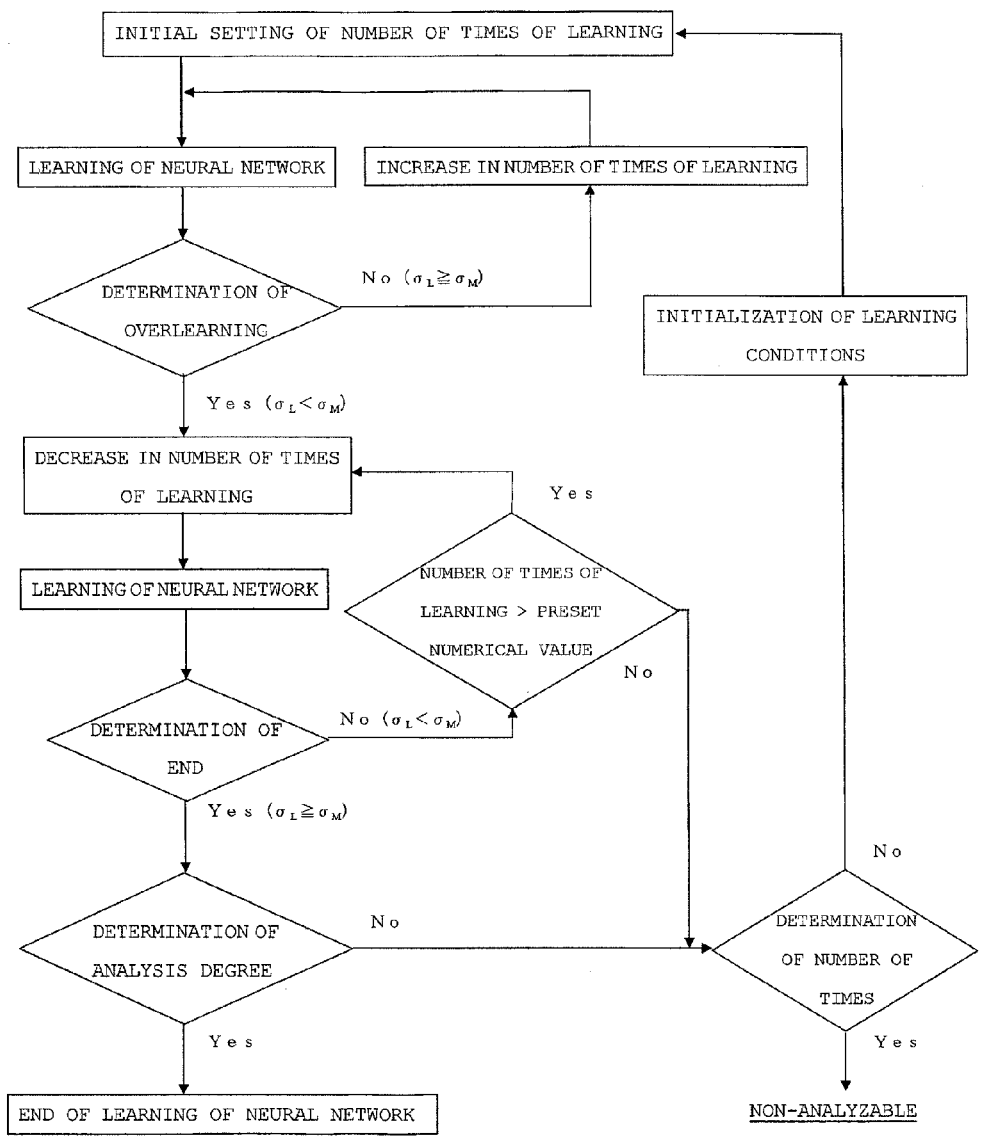
FIG. 1 is a flow diagram illustrating an example of a learning method for a neural network to be used in a prediction method of the present invention.

The present invention is hereinafter described in detail.

A prediction method of the present invention encompasses a method of predicting the quality or manufacturing conditions of cement through use of a neural network including an input layer for inputting an actually measured value of observation data in cement manufacturing and an output layer for outputting an estimated value of evaluation data related to the evaluation of the quality or manufacturing conditions of cement.

The neural network of the present invention may be a hierarchical neural network including an intermediate layer between the input layer and the output layer.

As the combination of the observation data and the evaluation data, the following (i) or (ii) is given.

(i) a combination in which the observation data is one or more kinds of data selected from data on a clinker raw material, data on burning conditions, data on grinding conditions, and data on clinker, and the evaluation data is data on a clinker raw material, data on burning conditions, data on grinding conditions, data on clinker, and data on cement (ii) a combination in which the observation data is data on a clinker raw material, data on burning conditions, data on grinding conditions, data on clinker, and data on cement, and the evaluation data is data on physical properties of a cement-containing hydraulic composite As the "data on a clinker raw material," which is one of the observation data in the combination (i), there are given: a chemical composition of a clinker raw material; a hydraulic modulus of a clinker raw material; a residual amount; a Blaine specific surface area (fineness); an ignition loss; a chemical composition of a main clinker raw material (for example, a commonly-used blended raw material such as a clinker raw material for ordinary portland cement) at a time point before predetermined time from loading into a kiln (for example, at one time point before 5 hours, or at a plurality of time points, e.g., four time points before 3 hours, 4 hours, 5 hours, and 6 hours); a hydraulic modulus of a main clinker raw material (for example, a commonly-used blended raw material such as a clinker raw material for ordinary portland cement) at a time point before predetermined time from loading into a kiln (for example, at one time point before 5 hours, or at a plurality of time points, e.g., four time points before 3 hours, 4 hours, 5 hours, and 6 hours); a supply amount of a main clinker raw material; a supply amount of a clinker auxiliary raw material including a special raw material such as a waste material; a storage amount (remaining amount) in a blending silo; a storage amount (remaining amount) in a raw material storage silo; a current value of a cyclone located between a raw material mill and a blending silo (one representing a rotation number of the cyclone and showing a correlation with a speed of a raw material passing through the cyclone); a chemical composition immediately before loading into a kiln; a hydraulic modulus immediately before loading into a kiln; a Blaine specific surface area immediately before loading into a kiln; a residual amount immediately before loading into a kiln; a decarbonation ratio immediately before loading into a kiln; a water amount immediately before loading into a kiln; and the like. One kind of those data may be used alone, or two or more kinds thereof may be used in combination.

The "chemical composition of a clinker raw material" used herein refers to the contents of $SiO_2$, $Al_2O_3$, $Fe_2O_3$, CaO, MgO, $SO_3$, $Na_2O$, $K_2O$, and $Na_2Oeq$ (total alkali), $TiO_2$, $P_2O_5$, MnO, Cl, Cr, Zn, Pb, Cu, Ni, V, As, Zr, Mo, Sr, Ba, F, and the like in the clinker raw material.

As the "data on burning conditions," which is one of the observation data in the combination (i), there are given: a CFW into a kiln; a rotation number; a kiln outlet temperature; a burning zone temperature; a clinker temperature; average torque of a kiln; an $O_2$ concentration; a $NO_X$ concentration; a cooler temperature; a flow rate of gas in a preheater (one showing a correlation with a preheater temperature); and the like. One of those data may be used alone, or two or more thereof may be used in combination.

As the "data on grinding conditions," which is one of the observation data in the combination (i), there are given: a grinding temperature; a watering amount; an air flow volume of a separator; an added amount of gypsum; a loading amount of clinker; a rotation number of a mill; a temperature of powder to be discharged from a mill; an amount of powder to be discharged from a mill; an amount of powder not to be discharged from a mill; grindability; and the like.

As the "data on clinker," which is one of the observation data in the combination (i), there are given: a mineral composition of clinker; crystallographic properties of each mineral (such as a lattice constant or a crystallite size); a composition ratio among two or more kinds of minerals; a chemical composition; a free lime content determined by wet analysis (abbreviated as wet f.CaO in Tables described later), a bulk density of clinker; and the like. One of those data may be used alone, or two or more thereof may be used in combination.

The "mineral composition of clinker" used herein refers to the contents of $3CaO.SiO_2$ ($C_3S$), $2CaO.SiO_2$ ($C_2S$), $3CaO.Al_2O_3$ ($C_3A$), $4CaO.Al_2O_3.Fe_2O_3$ ($C_4AF$), f.CaO, f.MgO, and the like. In addition, as the "composition ratio among two or more kinds of minerals," there is given, for example, a ratio of $C_3S/C_2S$.

It should be noted that the mineral composition of clinker may be obtained through Rietveld refinement, for example.

The "chemical composition of clinker" used herein refers to the contents of $SiO_2$, $Al_2O_3$, $Fe_2O_3$, CaO, MgO, $SO_3$, $Na_2O$, $K_2O$, and $Na_2Oeq$ (total alkali), $TiO_2$, $P_2O_5$, MnO, Cl, Cr, Zn, Pb, Cu, Ni, V, As, Zr, Mo, Sr, Ba, F, and the like in clinker.

In the combination (i), any one kind of data selected from the data on a clinker raw material, the data on burning conditions, the data on grinding conditions, and the data on clinker may be used alone as the observation data. However, of those data of four kinds, two or more kinds of (i.e. a plurality of) data are preferably used with a view to enhancing prediction accuracy of the evaluation data.

The "data on a clinker raw material," the "data on burning conditions," the "data on grinding conditions," and the "data on clinker," which are the evaluation data in the combination (i), are the same as the "data on a clinker raw material," the "data on burning conditions," the "data on grinding conditions," and the "data on clinker," which are the observation data described above, respectively.

In addition, the "data on a clinker raw material and a cement raw material," the "data on burning conditions," and the "data on grinding conditions" described above can double (i.e. be used) as the observation data.

As the "data on cement," which is one of the evaluation data in the combination (i), there are given: a Blaine specific surface area; a residual amount; a ratio of hemihydrate gypsum; a color L value; a color b value; a color a value; and the like.

Of those data in the combination (i), Tables 1 to 4 described below show preferred combinations of kinds of the evaluation data and the observation data from the viewpoint of predicting quality or manufacturing conditions of cement with high accuracy.

Now, of those "data on clinker," which is one of the evaluation data shown in Table 4, the "free lime content determined by wet analysis (free lime)" is taken as an example. In view of the prediction of the f.CaO with high accuracy, preferred combinations of the observation data and the evaluation data are as described below. Preferred observation data are: of those "data on a clinker raw material," the "chemical composition of a clinker raw material," the "hydraulic modulus of a clinker raw material," the "residual amount," the "Blaine specific surface area," the "ignition loss," the "chemical composition of a main clinker raw material (for example, a commonly-used blended raw material such as a clinker raw material for ordinary portland cement) at a time point before predetermined time from loading into a kiln (for example, at one time point before 5 hours, or at a plurality of time points, e.g., four time points before 3 hours, 4 hours, 5 hours, and 6 hours)," the "hydraulic modulus of a main clinker raw material (for example, a commonly-used blended raw material such as a clinker raw material for ordinary portland cement) at a time point before predetermined time before loading into a kiln (for example, at one time point before 5 hours, or at a plurality of time points, e.g., four time points before 3 hours, 4 hours, 5 hours, and 6 hours)," the "supply amount of a main clinker raw material," the "supply amount of a supplementary clinker raw material including a special raw material such as a waste material," the "storage amount (remaining amount) in a blending silo," the "storage amount (remaining amount) in a raw material storage silo," the "current value of a cyclone located between a raw material mill and a blending silo (one representing a rotation number of the cyclone and showing a correlation with a speed of a raw material passing through the cyclone)," the "chemical composition immediately before loading into a kiln," the "hydraulic modulus immediately before loading into a kiln," the "Blaine specific surface area immediately before loading into a kiln," the "residual amount immediately before loading into a kiln," the "decarbonation ratio immediately before loading into a kiln," and the "water amount immediately before loading into a kiln"; of those "data on burning conditions," the "CFW into a kiln," the "rotation number," the "kiln outlet temperature," the "burning zone temperature," the "clinker temperature," the "average torque of a kiln," the "$O_2$ concentration," the "$NO_X$ concentration," the "cooler temperature," and the "flow rate of gas in a preheater (one showing a correlation with a preheater temperature)"; of those "data on grinding conditions," the "loading amount of gypsum," the "added amount of clinker," the "rotation number of a mill," the "temperature of powder to be discharged from a mill," the "amount of powder to be discharged from a mill," the "amount of powder not to be discharged from a mill," and the "grindability"; and of those "data on clinker," the "mineral composition of clinker," the "crystallographic properties of each mineral," the "composition ratio among two or more kinds of minerals," the "chemical composition," and the "bulk density of clinker." Preferred evaluation data is, of those "data on clinker," the "free lime content determined by wet analysis."

More preferred observation data are: of those "data on clinker," the "chemical composition" and the "bulk density of clinker"; of those "data on burning conditions," the "kiln outlet temperature," the "burning zone temperature of a kiln," and the "average torque of a kiln"; and of those "data on a clinker raw material," the "chemical composition of a clinker raw material." More preferred evaluation data is, of those "data on clinker," the "free lime content determined by wet analysis (free lime)."

TABLE 1

|  |  |  | Observation data Data on clinker raw material | | | | | |
|---|---|---|---|---|---|---|---|---|
|  |  |  | Chemical composition | Hydraulic modulus | Residual amount | Blaine specific surface area (fineness) | Loss on ignition | Chemical composition before predetermined time[1] |
| Evaluation data | Data on clinker raw material | Chemical composition |  |  |  |  | ○ | ○ |
|  |  | Hydraulic modulus |  |  |  |  | ○ | ○ |
|  |  | Residual amount |  |  |  | ○ |  | ○ |
|  |  | Blaine specific surface area (fineness) |  |  | ○ |  |  | ○ |
|  |  | Loss on ignition | ○ | ○ | ○ | ○ |  | ○ |
|  |  | Chemical composition before predetermined time[1] | ○ | ○ |  |  |  |  |
|  |  | Hydraulic modulus before predetermined time[2] | ○ | ○ |  |  |  |  |
|  |  | Supply amount |  |  |  |  |  |  |
|  |  | Supply amount of clinker supplementary raw material[3] |  |  |  |  |  | ○ |
|  |  | Storage amount in blending silo (remaining amount) |  |  |  |  |  | ○ |
|  |  | Storage amount in raw material storage silo (remaining amount) |  |  |  |  |  | ○ |
|  |  | Current value of cyclone[4] |  |  |  |  |  | ○ |
|  |  | Chemical composition immediately before loading into kiln |  |  |  |  | ○ | ○ |
|  |  | Hydraulic modulus immediately before loading into kiln |  |  |  |  | ○ | ○ |

TABLE 1-continued

|  | col1 | col2 | col3 | col4 | col5 | col6 |
|---|---|---|---|---|---|---|
| Blaine specific surface area immediately before loading into kiln |  |  | ○ |  |  | ○ |
| Residual amount immediately before loading into kiln |  |  |  | ○ |  | ○ |
| Decarbonation ratio immediately before loading into kiln | ○ | ○ |  |  |  | ○ |
| Water amount immediately before loading into kiln | ○ | ○ | ○ | ○ | ○ | ○ |

| | | | Observation data — Data on clinker raw material | | | |
|---|---|---|---|---|---|---|
| | | | Hydraulic modulus before predetermined time[2] | Supply amount | Supply amount of clinker supplementary raw material[3] | Storage amount in blending silo (remaining amount) |
| Evaluation data | Data on clinker raw material | Chemical composition | ○ | ○ | ○ | ○ |
| | | Hydraulic modulus | ○ | ○ | ○ | ○ |
| | | Residual amount | ○ | ○ | ○ | ○ |
| | | Blaine specific surface area (fineness) | ○ | ○ | ○ | ○ |
| | | Loss on ignition | ○ | ○ | ○ | ○ |
| | | Chemical composition before predetermined time[1] |  | ○ | ○ | ○ |
| | | Hydraulic modulus before predetermined time[2] |  | ○ | ○ | ○ |
| | | Supply amount |  |  | ○ | ○ |
| | | Supply amount of clinker supplementary raw material[3] | ○ | ○ |  | ○ |
| | | Storage amount in blending silo (remaining amount) | ○ | ○ | ○ |  |
| | | Storage amount in raw material storage silo (remaining amount) | ○ | ○ | ○ | ○ |
| | | Current value of cyclone[4] | ○ | ○ | ○ | ○ |
| | | Chemical composition immediately before loading into kiln | ○ | ○ | ○ | ○ |
| | | Hydraulic modulus immediately before loading into kiln | ○ | ○ | ○ | ○ |
| | | Blaine specific surface area immediately before loading into kiln | ○ | ○ | ○ | ○ |
| | | Residual amount immediately before loading into kiln | ○ | ○ | ○ | ○ |
| | | Decarbonation ratio immediately before loading into kiln | ○ | ○ | ○ | ○ |
| | | Water amount immediately before loading into kiln | ○ | ○ | ○ | ○ |

| | | | Observation data — Data on clinker raw material | | | |
|---|---|---|---|---|---|---|
| | | | Storage amount in storage silo (remaining amount) | Current value of cyclone[4] | Chemical composition immediately before loading into kiln | Hydraulic modulus immediately before loading into kiln |
| Evaluation data | Data on clinker | Chemical composition | ○ | ○ | ○ | ○ |
| | | Hydraulic modulus | ○ | ○ | ○ | ○ |
| | | Residual amount | ○ | ○ | ○ | ○ |

TABLE 1-continued

| | | Blaine specific surface area immediately before loading into kiln | Residual amount immediately before loading into kiln | Decarbonation ratio immediately before loading into kiln | Water amount immediately before loading into kiln |
|---|---|---|---|---|---|
| raw material | Blaine specific surface area (fineness) | ○ | ○ | ○ | ○ |
| | Loss on ignition | ○ | ○ | ○ | ○ |
| | Chemical composition before predetermined time[1] | ○ | ○ | ○ | ○ |
| | Hydraulic modulus before predetermined time[2] | ○ | ○ | ○ | ○ |
| | Supply amount | ○ | ○ | ○ | ○ |
| | Supply amount of clinker supplementary raw material[3] | ○ | ○ | ○ | ○ |
| | Storage amount in blending silo (remaining amount) | ○ | ○ | ○ | ○ |
| | Storage amount in raw material storage silo (remaining amount) | | ○ | ○ | ○ |
| | Current value of cyclone[4] | ○ | | ○ | ○ |
| | Chemical composition immediately before loading into kiln | ○ | ○ | | ○ |
| | Hydraulic modulus immediately before loading into kiln | ○ | ○ | ○ | |
| | Blaine specific surface area immediately before loading into kiln | ○ | ○ | ○ | ○ |
| | Residual amount immediately before loading into kiln | ○ | ○ | ○ | ○ |
| | Decarbonation ratio immediately before loading into kiln | ○ | ○ | ○ | ○ |
| | Water amount immediately before loading into kiln | ○ | ○ | ○ | ○ |

| | | | Observation data — Data on clinker raw material | | | |
|---|---|---|---|---|---|---|
| | | | Blaine specific surface area immediately before loading into kiln | Residual amount immediately before loading into kiln | Decarbonation ratio immediately before loading into kiln | Water amount immediately before loading into kiln |
| Evaluation data | Data on clinker raw material | Chemical composition | ○ | ○ | ○ | ○ |
| | | Hydraulic modulus | ○ | ○ | ○ | ○ |
| | | Residual amount | ○ | ○ | ○ | ○ |
| | | Blaine specific surface area (fineness) | ○ | ○ | ○ | ○ |
| | | Loss on ignition | ○ | ○ | ○ | ○ |
| | | Chemical composition before predetermined time[1] | ○ | ○ | ○ | ○ |
| | | Hydraulic modulus before predetermined time[2] | ○ | ○ | ○ | ○ |
| | | Supply amount | ○ | ○ | ○ | ○ |
| | | Supply amount of clinker supplementary raw material[3] | ○ | ○ | ○ | ○ |
| | | Storage amount in blending silo (remaining amount) | ○ | ○ | ○ | ○ |
| | | Storage amount in raw material storage silo (remaining amount) | ○ | ○ | ○ | ○ |
| | | Current value of cyclone[4] | ○ | ○ | ○ | ○ |
| | | Chemical composition immediately before loading into kiln | ○ | ○ | ○ | ○ |
| | | Hydraulic modulus immediately before loading into kiln | ○ | ○ | ○ | ○ |

TABLE 1-continued

| | | | |
|---|---|---|---|
| Blaine specific surface area immediately before loading into kiln | | ○ | ○ | ○ |
| Residual amount immediately before loading into kiln | ○ | | ○ | ○ |
| Decarbonation ratio immediately before loading into kiln | ○ | ○ | | ○ |
| Water amount immediately before loading into kiln | ○ | ○ | ○ | |

[1] A chemical composition at a time point before predetermined time from loading into a kiln (for example, at one time point before 5 hours, or at a plurality of time points, e.g., four time points before 3 hours, 4 hours, 5 hours, and 6 hours)
[2] A hydraulic modulus at a time point before predetermined time from loading into a kiln (for example, at one time point before 5 hours, or at a plurality of time points, e.g., four time points before 3 hours, 4 hours, 5 hours, and 6 hours)
[3] A supply amount of a clinker supplementary raw material including a special raw material such as a waste material
[4] A current value of a cyclone located between a raw material mill and a blending silo

TABLE 2

| | | | Observation data Data on clinker raw material | | | | | | | | | |
|---|---|---|---|---|---|---|---|---|---|---|---|---|
| | | | Chemical composition | Hydraulic modulus | Residual amount | Blaine specific surface area (fineness) | Loss on ignition | Chemical composition before predetermined time[1] | Hydraulic modulus before predetermined time[2] | Supply amount | Supply amount of clinker supplementary raw material[3] | Storage amount in blending silo (remaining amount) |
| Evaluation data | Data on burning conditions | CFW into kiln | ○ | ○ | ○ | ○ | ○ | ○ | ○ | ○ | ○ | ○ |
| | | Rotation number | ○ | ○ | ○ | ○ | ○ | ○ | ○ | ○ | ○ | ○ |
| | | Kiln outlet temperature | ○ | ○ | ○ | ○ | ○ | ○ | ○ | ○ | ○ | ○ |
| | | Burning zone temperature | ○ | ○ | ○ | ○ | ○ | ○ | ○ | ○ | ○ | ○ |
| | | Clinker temperature | ○ | ○ | ○ | ○ | ○ | ○ | ○ | ○ | ○ | ○ |
| | | Average torque of kiln | ○ | ○ | ○ | ○ | ○ | ○ | ○ | ○ | ○ | ○ |
| | | $O_2$ concentration | ○ | ○ | ○ | ○ | ○ | ○ | ○ | ○ | ○ | ○ |
| | | $NO_x$ concentration | ○ | ○ | ○ | ○ | ○ | ○ | ○ | ○ | ○ | ○ |
| | | Cooler temperature | ○ | ○ | ○ | ○ | ○ | ○ | ○ | ○ | ○ | ○ |
| | | Flow rate of gas in preheater[5] | ○ | ○ | ○ | ○ | ○ | ○ | ○ | ○ | ○ | ○ |

| | | | Observation data Data on clinker raw material | | | | | | | |
|---|---|---|---|---|---|---|---|---|---|---|
| | | | Storage amount in storage silo (remaining amount) | Current value of cyclone[4] | Chemical composition immediately before loading into kiln | Hydraulic modulus immediately before loading into kiln | Blaine specific surface area immediately before loading into kiln | Residual amount immediately before loading into kiln | Decarbonation ratio immediately before loading into kiln | Water amount immediately before loading into kiln |
| Evaluation data | Data on burning conditions | CFW into kiln | ○ | ○ | ○ | ○ | ○ | ○ | ○ | ○ |
| | | Rotation number | ○ | ○ | ○ | ○ | ○ | ○ | ○ | ○ |
| | | Kiln outlet temperature | ○ | ○ | ○ | ○ | ○ | ○ | ○ | ○ |
| | | Burning zone temperature | ○ | ○ | ○ | ○ | ○ | ○ | ○ | ○ |
| | | Clinker temperature | ○ | ○ | ○ | ○ | ○ | ○ | ○ | ○ |
| | | Average torque of kiln | ○ | ○ | ○ | ○ | ○ | ○ | ○ | ○ |
| | | $O_2$ concentration | ○ | ○ | ○ | ○ | ○ | ○ | ○ | ○ |

TABLE 2-continued

| | | | | | | | | | |
|---|---|---|---|---|---|---|---|---|---|
| | | NO$_x$ concentration | ○ | ○ | ○ | ○ | ○ | ○ | ○ | ○ |
| | | Cooler temperature | ○ | ○ | ○ | ○ | ○ | ○ | ○ | ○ |
| | | Flow rate of gas in preheater[5] | ○ | ○ | ○ | ○ | ○ | ○ | ○ | ○ |

| | | | Observation data | | | | | | | |
|---|---|---|---|---|---|---|---|---|---|---|
| | | | Data on burning conditions | | | | | | | |
| | | | CFW into kiln | Rotation number | Kiln outlet temperature | Burning zone temperature | Clinker temperature | Average torque of kiln | O$_2$ concentration | NO$_x$ concentration |
| Evaluation data | Data on burning conditions | CFW into kiln | | ○ | ○ | ○ | ○ | ○ | ○ | ○ |
| | | Rotation number | ○ | | ○ | ○ | ○ | ○ | ○ | ○ |
| | | Kiln outlet temperature | ○ | ○ | | ○ | ○ | ○ | ○ | ○ |
| | | Burning zone temperature | ○ | ○ | ○ | | ○ | ○ | ○ | ○ |
| | | Clinker temperature | ○ | ○ | ○ | ○ | | ○ | ○ | ○ |
| | | Average torque of kiln | ○ | ○ | ○ | ○ | ○ | | ○ | ○ |
| | | O$_2$ concentration | ○ | ○ | ○ | ○ | ○ | ○ | | ○ |
| | | NO$_x$ concentration | ○ | ○ | ○ | ○ | ○ | ○ | ○ | |
| | | Cooler temperature | ○ | ○ | ○ | ○ | ○ | ○ | ○ | ○ |
| | | Flow rate of gas in preheater[5] | ○ | ○ | ○ | ○ | ○ | ○ | ○ | ○ |

| | | | Observation data | | | | | | | |
|---|---|---|---|---|---|---|---|---|---|---|
| | | | Data on burning conditions | | Data on clinker | | | | | |
| | | | Cooler temperature | Flow rate of gas in preheater[5] | Mineral composition | Crystallographic properties of each mineral[6] | Composition ratio among two or more kinds of minerals | Chemical composition | Wet f. CaO (free lime) | Bulk density of clinker |
| Evaluation data | Data on burning conditions | CFW into kiln | ○ | ○ | ○ | ○ | ○ | ○ | ○ | ○ |
| | | Rotation number | ○ | ○ | ○ | ○ | ○ | ○ | ○ | ○ |
| | | Kiln outlet temperature | ○ | ○ | ○ | ○ | ○ | ○ | ○ | ○ |
| | | Burning zone temperature | ○ | ○ | ○ | ○ | ○ | ○ | ○ | ○ |
| | | Clinker temperature | ○ | ○ | ○ | ○ | ○ | ○ | ○ | ○ |
| | | Average torque of kiln | ○ | ○ | ○ | ○ | ○ | ○ | ○ | ○ |
| | | O$_2$ concentration | ○ | ○ | ○ | ○ | ○ | ○ | ○ | ○ |
| | | NO$_x$ concentration | ○ | ○ | ○ | ○ | ○ | ○ | ○ | ○ |
| | | Cooler temperature | | | ○ | | | ○ | | |
| | | Flow rate of gas in preheater[5] | ○ | | | ○ | ○ | ○ | ○ | ○ |

[1] A chemical composition at a time point before predetermined time from loading into a kiln (for example, at one time point before 5 hours, or at a plurality of time points, e.g., four time points before 3 hours, 4 hours, 5 hours, and 6 hours)
[2] A hydraulic modulus at a time point before predetermined time from loading into a kiln (for example, at one time point before 5 hours, or at a plurality of time points, e.g., four time points before 3 hours, 4 hours, 5 hours, and 6 hours)
[3] A supply amount of a clinker supplementary raw material including a special raw material such as a waste material
[4] A current value of a cyclone located between a raw material mill and a blending silo
[5] A flow rate of gas in a preheater (one showing a correlation with a preheater temperature)
[6] A lattice constant, a crystallite size, or the like

TABLE 3

| | | | Observation data | | | | | | | | | | |
|---|---|---|---|---|---|---|---|---|---|---|---|---|---|
| | | | Data on clinker raw material | | | | Data on burning conditions | | | | | | |
| | | | Chemical composition | Hydraulic modulus | Residual amount | Blaine specific surface area (fineness) | Loss on ignition | CFW into kiln | Rotation number | Kiln outlet temperature | Burning zone temperature | Clinker temperature | |
| Evaluation data | Data on grinding conditions | Grinding temperature | ○ | ○ | ○ | ○ | ○ | ○ | ○ | ○ | ○ | ○ | |
| | | Watering amount | ○ | ○ | ○ | ○ | ○ | ○ | ○ | ○ | ○ | ○ | |
| | | Air flow volume of separator | ○ | ○ | ○ | ○ | ○ | ○ | ○ | ○ | ○ | ○ | |
| | | Added amount of gypsum | ○ | ○ | ○ | ○ | ○ | ○ | ○ | ○ | ○ | ○ | |
| | | Loading amount of clinker | | | | | ○ | ○ | ○ | ○ | ○ | ○ | |
| | | Rotation number of mill | | | | | ○ | ○ | ○ | ○ | ○ | ○ | |
| | | Temperature of powder to be discharged from mill | | | | | ○ | ○ | ○ | ○ | ○ | ○ | |
| | | Amount of powder to be discharged from mill | | | | | ○ | ○ | ○ | ○ | ○ | ○ | |
| | | Amount of powder not to be discharged from mill | | | | | ○ | ○ | ○ | ○ | ○ | ○ | |
| | | Grindability | | | | | ○ | ○ | ○ | ○ | ○ | ○ | |

| | | | Observation data | | | | | | |
|---|---|---|---|---|---|---|---|---|---|
| | | | Data on burning conditions | | | | | Data on grinding conditions | |
| | | | Average torque of kiln | $O_2$ concentration | $NO_x$ concentration | Cooler temperature | Flow rate of gas in pre-heater[1] | Grinding temperature | Watering amount |
| Evaluation data | Data on grinding conditions | Grinding temperature | ○ | ○ | ○ | ○ | ○ | | ○ |
| | | Watering amount | ○ | ○ | ○ | ○ | ○ | ○ | |
| | | Air flow volume of separator | ○ | ○ | ○ | ○ | ○ | ○ | ○ |
| | | Added amount of gypsum | ○ | ○ | ○ | ○ | ○ | ○ | ○ |
| | | Loading amount of clinker | ○ | ○ | ○ | ○ | ○ | ○ | ○ |
| | | Rotation number of mill | ○ | ○ | ○ | ○ | ○ | ○ | ○ |
| | | Temperature of powder to be discharged from mill | ○ | ○ | ○ | ○ | ○ | ○ | ○ |
| | | Amount of powder to be discharged from mill | ○ | ○ | ○ | ○ | ○ | ○ | ○ |
| | | Amount of powder not to be discharged from mill | ○ | ○ | ○ | ○ | ○ | ○ | ○ |
| | | Grindability | ○ | ○ | ○ | ○ | ○ | ○ | ○ |

| | | | Observation data | | | | | | |
|---|---|---|---|---|---|---|---|---|---|
| | | | Data on grinding conditions | | | | | | |
| | | | Air flow volume of separator | Added amount of gypsum | Loading amount of clinker | Rotation number of mill | Temperature of powder to be discharged from mill | Amount of powder to be discharged from mill | Amount of powder not to be discharged from mill |
| Evaluation data | Data on grinding conditions | Grinding temperature | ○ | ○ | ○ | ○ | ○ | ○ | ○ |
| | | Watering amount | ○ | ○ | ○ | ○ | ○ | ○ | ○ |
| | | Air flow volume of separator | | ○ | ○ | ○ | ○ | ○ | ○ |

TABLE 3-continued

| | | | | | | | | | |
|---|---|---|---|---|---|---|---|---|---|
| di-tions | Added amount of gypsum | ○ | | ○ | ○ | ○ | ○ | ○ | |
| | Loading amount of clinker | ○ | ○ | | ○ | ○ | ○ | ○ | |
| | Rotation number of mill | ○ | ○ | ○ | | | ○ | ○ | |
| | Temperature of powder to be discharged from mill | ○ | ○ | ○ | ○ | | ○ | ○ | |
| | Amount of powder to be discharged from mill | ○ | ○ | ○ | ○ | ○ | | ○ | |
| | Amount of powder not to be discharged from mill | ○ | ○ | ○ | ○ | ○ | ○ | | |
| | Grindability | ○ | ○ | ○ | ○ | ○ | ○ | ○ | |

| | | | Observation data | | | | | | |
|---|---|---|---|---|---|---|---|---|---|
| | | | Data on clinker | | | | | | |
| | | | Data on grinding conditions Grindability | Mineral composition | Crystallographic properties of each mineral[2] | Composition ratio among two or more kinds of minerals | Chemical composition | Wet f. CaO (free lime) | Bulk density of clinker |
| Evaluation data | Data on grinding conditions | Grinding temperature | ○ | ○ | ○ | ○ | ○ | ○ | ○ |
| | | Watering amount | ○ | ○ | ○ | ○ | ○ | ○ | ○ |
| | | Air flow volume of separator | ○ | ○ | ○ | ○ | ○ | ○ | ○ |
| | | Added amount of gypsum | ○ | | ○ | | | | |
| | | Loading amount of clinker | ○ | ○ | ○ | ○ | ○ | ○ | ○ |
| | | Rotation number of mill | ○ | ○ | ○ | ○ | ○ | ○ | ○ |
| | | Temperature of powder to be discharged from mill | ○ | ○ | ○ | ○ | ○ | ○ | ○ |
| | | Amount of powder to be discharged from mill | ○ | ○ | ○ | ○ | ○ | ○ | ○ |
| | | Amount of powder not to be discharged from mill | ○ | ○ | ○ | ○ | ○ | ○ | ○ |
| | | Grindability | | ○ | ○ | ○ | ○ | ○ | ○ |

[1] A flow rate of gas in a preheater (one showing a correlation with a preheater temperature)
[2] A lattice constant, a crystallite size, or the like

TABLE 4

| | | | Observation data | | | | | | | | | | |
|---|---|---|---|---|---|---|---|---|---|---|---|---|---|
| | | | Data on clinker raw material | | | | | | | | | | |
| | | | Chemical composition | Hydraulic modulus | Residual amount | Blaine specific surface area (fineness) | Loss on ignition | Chemical composition before predetermined time[1] | Hydraulic modulus before predetermined time[2] | Supply amount | Supply amount of clinker supplementary raw material[3] | Storage amount in blending silo (remaining amount) | Storage amount in storage silo (remaining amount) |
| Evaluation data | Data on clinker | Mineral composition | ○ | ○ | ○ | ○ | ○ | ○ | ○ | ○ | ○ | ○ | ○ |
| | | Crystallographic properties of each mineral[6] | ○ | ○ | ○ | ○ | ○ | ○ | ○ | ○ | ○ | ○ | ○ |

TABLE 4-continued

| | | | | | | | | | | | | |
|---|---|---|---|---|---|---|---|---|---|---|---|---|
| | | Composition ratio among two or more kinds of minerals | ○ | ○ | ○ | ○ | ○ | ○ | ○ | ○ | ○ | ○ | ○ |
| | | Chemical composition | ○ | ○ | ○ | ○ | ○ | ○ | ○ | ○ | ○ | ○ | ○ |
| | | Wet f. CaO (free lime) | ○ | ○ | ○ | ○ | ○ | ○ | ○ | ○ | ○ | ○ | ○ |
| | | Bulk density of clinker | ○ | ○ | ○ | ○ | ○ | ○ | ○ | ○ | ○ | ○ | ○ |
| | | Blaine specific surface area | | | | | | | | | | | |
| | | Residual amount | | | | | | | | | | | |
| | | Ratio of hemi-hydrate gypsum | | | | | | | | | | | |
| | | Color L value | ○ | ○ | | | ○ | ○ | ○ | ○ | ○ | ○ | ○ |
| | | Color b value | ○ | ○ | | | ○ | ○ | ○ | ○ | ○ | ○ | ○ |
| | | Color a value | ○ | ○ | | | ○ | ○ | ○ | ○ | ○ | ○ | ○ |

Observation data

Data on clinker raw material

| | | | Current value of cyclone[4] | Chemical composition immediately before loading into kiln | Hydraulic modulus immediately before loading into kiln | Blaine specific surface area immediately before loading into kiln | Residual amount immediately before loading into kiln | Decarbonation ratio immediately before loading into kiln | Water amount immediately before loading into kiln | CFW into kiln | Rotation number | Kiln outlet temperature | Burning zone temperature |
|---|---|---|---|---|---|---|---|---|---|---|---|---|---|
| Evaluation data | Data on clinker | Mineral composition | ○ | ○ | ○ | ○ | ○ | ○ | ○ | ○ | ○ | ○ | ○ |
| | | Crystallographic properties of each mineral[6] | ○ | ○ | ○ | ○ | ○ | ○ | ○ | ○ | ○ | ○ | ○ |
| | | Composition ratio among two or more kinds of minerals | ○ | ○ | ○ | ○ | ○ | ○ | ○ | ○ | ○ | ○ | ○ |
| | | Chemical composition | ○ | ○ | ○ | ○ | ○ | ○ | ○ | ○ | ○ | ○ | ○ |
| | | Wet f. CaO (free lime) | ○ | ○ | ○ | ○ | ○ | ○ | ○ | ○ | ○ | ○ | ○ |
| | | Bulk density of clinker | ○ | ○ | ○ | ○ | ○ | ○ | ○ | ○ | ○ | ○ | ○ |
| | | Blaine specific surface area | | | | | | | | | ○ | ○ | ○ | ○ |
| | | Residual amount | | | | | | | | | ○ | ○ | ○ | ○ |
| | | Ratio of hemi-hydrate gypsum | | | | | | | | | ○ | ○ | ○ | ○ |
| | | Color L value | ○ | ○ | ○ | ○ | ○ | ○ | ○ | ○ | ○ | ○ | ○ |
| | | Color b value | ○ | ○ | ○ | ○ | ○ | ○ | ○ | ○ | ○ | ○ | ○ |
| | | Color a value | ○ | ○ | ○ | ○ | ○ | ○ | ○ | ○ | ○ | ○ | ○ |

Observation data

| | | | Data on burning conditions | | | | | | Data on grinding conditions | | | | |
|---|---|---|---|---|---|---|---|---|---|---|---|---|---|
| | | | Clinker temperature | Average torque of kiln | $O_2$ concentration | $NO_x$ concentration | Cooler temperature | Flow rate of gas in preheater[5] | Grinding temperature | Watering amount | Air flow volume of separator | Added amount of gypsum | Loading amount of clinker |
| Evaluation | Data on | Mineral composition | ○ | ○ | ○ | ○ | ○ | ○ | ○ | ○ | ○ | ○ | ○ |

TABLE 4-continued

| data | clink-er | Crystallographic properties of each mineral[6] | o | o | o | o | o | o | o | o | o | o | o |
|---|---|---|---|---|---|---|---|---|---|---|---|---|---|
| | | Composition ratio among two or more kinds of minerals | o | o | o | o | o | o | o | o | o | o | |
| | | Chemical composition | o | o | o | o | o | o | o | o | o | o | |
| | | Wet f. CaO (free lime) | o | o | o | o | o | o | | | | o | o |
| | | Bulk density of clinker | o | o | o | o | o | o | | | | o | o |
| | | Blaine specific surface area | o | o | o | o | o | o | o | o | o | o | |
| | | Residual amount | o | o | o | o | o | o | o | o | o | o | |
| | | Ratio of hemihydrate gypsum | o | o | o | o | o | o | o | o | o | o | |
| | | Color L value | o | o | o | o | o | o | o | o | o | o | |
| | | Color b value | o | o | o | o | o | o | o | o | o | o | |
| | | Color a value | o | o | o | o | o | o | o | o | o | o | |

| | | | Observation data | | | | | | | | | | |
|---|---|---|---|---|---|---|---|---|---|---|---|---|---|
| | | | Data on grinding conditions | | | | | Data on clinker | | | | | |
| | | | Rotation number of mill | Temperature of powder to be discharged from mill | Amount of powder to be discharged from mill | Amount of powder not to be discharged from mill | Grindability | Mineral composition | Crystallographic properties of each mineral[6] | Composition ratio among two or more kinds of minerals | Chemical composition | Wet f. CaO (free lime) | Bulk density of clinker |
| Evaluation data | Data on clinker | Mineral composition | o | o | o | o | o | | | | o | o | o |
| | | Crystallographic properties of each mineral[6] | o | o | o | o | o | | | | o | o | o |
| | | Composition ratio among two or more kinds of minerals | o | o | o | o | o | | | | o | o | o |
| | | Chemical composition | o | o | o | o | o | o | o | o | | o | o |
| | | Wet f. CaO (free lime) | o | o | o | o | o | o | o | o | o | | o |
| | | Bulk density of clinker | o | o | o | o | o | o | o | o | o | o | |
| | | Blaine specific surface area | o | o | o | o | o | o | o | o | o | o | o |
| | | Residual amount | o | o | o | o | o | o | o | o | o | o | o |
| | | Ratio of hemihydrate gypsum | o | o | o | o | o | o | o | o | o | o | o |
| | | Color L value | o | o | o | o | o | o | o | o | o | o | o |
| | | Color b value | o | o | o | o | o | o | o | o | o | o | o |
| | | Color a value | o | o | o | o | o | o | o | o | o | o | o |

[1] A chemical composition at a time point before predetermined time from loading into a kiln (for example, at one time point before 5 hours, or at a plurality of time points, e.g., four time points before 3 hours, 4 hours, 5 hours, and 6 hours)
[2] A hydraulic modulus at a time point before predetermined time from loading into a kiln (for example, at one time point before 5 hours, or at a plurality of time points, e.g., four time points before 3 hours, 4 hours, 5 hours, and 6 hours)
[3] A supply amount of a clinker supplementary raw material including a special raw material such as a waste material
[4] A current value of a cyclone located between a raw material mill and a blending silo
[5] A flow rate of gas in a preheater (one showing a correlation with a preheater temperature)
[6] A lattice constant, a crystallite size, or the like.

The "data on a clinker raw material," the "data on burning conditions," the "data on grinding conditions," and the "data on clinker," which are the observation data in the combination (ii), are the same as the "data on a clinker raw material," the "data on burning conditions," the "data on grinding conditions," and the "data on clinker," which are the observation data in the combination (i), respectively.

As the "data on cement," which is one of the observation data in the combination (ii), there are given: a chemical composition of cement; a mineral composition of cement;

crystallographic properties of each mineral (such as a lattice constant or a crystallite size); free lime content determined by wet analysis (free lime); a loss on ignition; a Blaine specific surface area; a grain size distribution; a residual amount; a color L value; a color a value; a color b value; and the like.

One kind of those data may be used alone, or two or more kinds thereof may be used in combination.

The phrase "chemical composition of cement" used herein refers to the contents of $SiO_2$, $Al_2O_3$, $Fe_2O_3$, CaO, MgO, $SO_3$, $Na_2O$, $K_2O$, and $Na_2Oeq$ (total alkali), $TiO_2$, $P_2O_5$, MnO, Cl, Cr, Zn, Pb, Cu, Ni, V, As, Zr, Mo, Sr, Ba, F, and the like in a cement raw material.

The phrase "mineral composition of cement" refers to the contents of $3CaO.SiO_2$ ($C_3S$), $2CaO.SiO_2$ ($C_2S$), $3CaI.Al_2O_3$ ($C_3A$) $4CaO.Al_2O_3.Fe_2O_3$ ($C_4AF$) f.CaO, f.MgO, gypsum, calcite, and the like.

It should be noted that, as the data of the chemical composition and mineral composition of cement, the "data on clinker," which is one of the evaluation data in the combination (i), may be utilized.

As the "data on physical properties of a cement-containing hydraulic composite," which is one of the evaluation data in the combination (ii), there are given: compressive strength of mortar; flexural (i.e. bending) strength; fluidity (flow value); hydration heat; a setting time period; a drying shrinkage rate; stability; expansion in water; sulfate resistance; carbonation; ASR resistance; and the like.

In the combination (ii), combinations of the observation data and the evaluation data as shown in Table 5 below are preferred from the viewpoint of predicting quality or manufacturing conditions of cement with high accuracy.

Now, of those "data on physical properties of a cement-containing hydraulic composite," which is one of the evaluation data, preferred combinations of the observation data and the evaluation data for predicting the "compressive strength of mortar" with high accuracy are as described below. Preferred observation data are: of those "data on a clinker raw material," the "chemical composition of a clinker raw material," the "hydraulic modulus of a clinker raw material," the "residual amount," the "Blaine specific surface area," and the "ignition loss"; of those "data on burning conditions," the "CFW into a kiln," the "rotation number," the "kiln outlet temperature," the "burning zone temperature," the "clinker temperature," the "average torque of a kiln," the "$O_2$ concentration," the "$NO_X$ concentration," the "cooler temperature," and the "flow rate of gas in a preheater (one showing a correlation with a preheater temperature)"; of those "data on grinding conditions," the "grinding temperature," the "watering amount," the "air flow volume of a separator," the "added amount of gypsum," the "loading amount of clinker," the "rotation number of a mill," the "temperature of powder to be discharged from a mill," the "amount of powder to be discharged from a mill," the "amount of powder not to be discharged from a mill," and the "grindability"; of those "data on clinker," the "mineral composition of clinker," the "crystallographic properties of each mineral," the "composition ratio among two or more kinds of minerals," the "chemical composition," and the "bulk density of clinker"; and of those "data on cement," the "chemical composition of cement," the "mineral composition of cement," the "crystallographic properties of each mineral (such as a lattice constant or a crystallite size)," the "free lime content determined by wet analysis," the "ignition loss," the "Blaine specific surface area," the "grain size distribution," the "residual amount," the "color L value," the "color a value," and the "color b value." Preferred evaluation data is, of those "data on physical properties of a cement-containing hydraulic composite," the "compressive strength of mortar."

More preferred observation data is: of those "data on cement," the "Blaine specific surface area," the "32 μm sieve residual amount," the "free lime content determined by wet analysis," the "amount of each mineral," and the "chemical composition (MgO, $SO_3$, $Na_2O$, $K_2O$, $P_2O_5$)"; and of those "data on burning conditions," the "kiln outlet temperature" and the "cooler temperature." More preferred evaluation data is, of those "data on physical properties of a cement-containing hydraulic composite," the "compressive strength of mortar."

TABLE 5

| | | | Monitoring data | | | | | | | | | | |
|---|---|---|---|---|---|---|---|---|---|---|---|---|---|
| | | | Data on clinker raw material | | | | | Data on burning conditions | | | | | |
| | | | Chemical composition | Hydraulic modulus | Residual amount | Blaine specific surface area (fineness) | Loss on ignition | CFW into kiln | Rotation number | Kiln outlet temperature | Burning zone temperature | Clinker temperature | Average torque of kiln |
| Evaluation data | Data on physical properties of cement-containing hydraulic composite | Compressive strength of mortar | ○ | ○ | ○ | ○ | ○ | ○ | ○ | ○ | ○ | ○ | ○ |
| | | Flexural strength | ○ | ○ | ○ | ○ | ○ | ○ | ○ | ○ | ○ | ○ | ○ |
| | | Fluidity (flow value) | | | | | | | | | | | |
| | | Hydration heat | ○ | ○ | ○ | ○ | ○ | ○ | ○ | ○ | ○ | ○ | ○ |
| | | Setting time period | ○ | ○ | ○ | ○ | ○ | ○ | ○ | ○ | ○ | ○ | ○ |
| | | Drying shrinkage rate | ○ | ○ | ○ | ○ | ○ | ○ | ○ | ○ | ○ | ○ | ○ |
| | | Stability | | | | | | | | | | | |
| | | Expansion in water | ○ | ○ | ○ | ○ | ○ | ○ | ○ | ○ | ○ | ○ | ○ |
| | | Sulfate resistance | ○ | ○ | ○ | ○ | ○ | ○ | ○ | ○ | ○ | ○ | ○ |

TABLE 5-continued

| | | ○ | ○ | ○ | ○ | ○ | ○ | ○ | ○ | ○ | ○ | ○ |
|---|---|---|---|---|---|---|---|---|---|---|---|---|
| | Carbonation | ○ | ○ | ○ | ○ | ○ | ○ | ○ | ○ | ○ | ○ | ○ |
| | ASR resistance | ○ | ○ | ○ | ○ | ○ | ○ | ○ | ○ | ○ | ○ | ○ |

| | | | Monitoring data | | | | | | | | | |
|---|---|---|---|---|---|---|---|---|---|---|---|---|
| | | | Data on burning conditions | | | | Data on grinding conditions | | | | | Temperature of powder to be discharged from mill |
| | | | $O_2$ concentration | $NO_x$ concentration | Cooler temperature | Flow rate of gas in pre-heater[1] | Grinding temperature | Watering amount | Air flow volume of separator | Added amount of gypsum | Loading amount of clinker | Rotation number of mill | |
| Evaluation data | Data on physical properties of cement-containing hydraulic composite | Compressive strength of mortar | ○ | ○ | ○ | ○ | ○ | ○ | ○ | ○ | ○ | ○ | ○ |
| | | Flexural strength | ○ | ○ | ○ | ○ | ○ | ○ | ○ | ○ | ○ | ○ | ○ |
| | | Fluidity (flow value) | | | | | ○ | ○ | ○ | ○ | ○ | ○ | ○ |
| | | Hydration heat | ○ | ○ | ○ | ○ | ○ | ○ | ○ | ○ | ○ | ○ | ○ |
| | | Setting time period | ○ | ○ | ○ | ○ | ○ | ○ | ○ | ○ | ○ | ○ | ○ |
| | | Drying shrinkage rate | ○ | ○ | ○ | ○ | ○ | ○ | ○ | ○ | ○ | ○ | ○ |
| | | Stability | | | | | | | | | | | |
| | | Expansion in water | ○ | ○ | ○ | ○ | ○ | ○ | ○ | ○ | ○ | ○ | ○ |
| | | Sulfate resistance | ○ | ○ | ○ | ○ | ○ | ○ | ○ | ○ | ○ | ○ | ○ |
| | | Carbonation | ○ | ○ | ○ | ○ | ○ | ○ | ○ | ○ | ○ | ○ | ○ |
| | | ASR resistance | ○ | ○ | ○ | ○ | ○ | ○ | ○ | ○ | ○ | ○ | ○ |

| | | | Monitoring data | | | | | | | | |
|---|---|---|---|---|---|---|---|---|---|---|---|
| | | | Data on grinding conditions | | | Data on clinker | | | | | |
| | | | Amount of powder to be discharged from mill | Amount of powder not to be discharged from mill | Grindability | Mineral composition of clinker | Crystallographic properties of each mineral[2] | Composition ratio among two or more kinds of minerals | Chemical composition | Wet f. CaO (free lime) | Bulk density of clinker |
| Evaluation data | Data on physical properties of cement-containing hydraulic composite | Compressive strength of mortar | ○ | ○ | ○ | ○ | ○ | ○ | ○ | ○ | ○ |
| | | Flexural strength | ○ | ○ | ○ | ○ | ○ | ○ | ○ | ○ | ○ |
| | | Fluidity (flow value) | ○ | ○ | ○ | ○ | ○ | ○ | ○ | ○ | ○ |
| | | Hydration heat | ○ | ○ | ○ | ○ | ○ | ○ | ○ | ○ | ○ |
| | | Setting time period | ○ | ○ | ○ | ○ | ○ | ○ | ○ | ○ | ○ |
| | | Drying shrinkage rate | ○ | ○ | ○ | ○ | ○ | ○ | ○ | ○ | ○ |
| | | Stability | | | | | ○ | | | | |
| | | Expansion in water | ○ | ○ | ○ | ○ | ○ | ○ | ○ | ○ | ○ |
| | | Sulfate resistance | ○ | ○ | ○ | ○ | ○ | ○ | ○ | ○ | ○ |
| | | Carbonation | ○ | ○ | ○ | ○ | ○ | ○ | ○ | ○ | ○ |
| | | ASR resistance | ○ | ○ | ○ | ○ | ○ | ○ | ○ | ○ | ○ |

| | | | Monitoring data | | | | | | | | | | |
|---|---|---|---|---|---|---|---|---|---|---|---|---|---|
| | | | Data on cement | | | | | | | | | | |
| | | | Chemical composition | Mineral composition | Crystallographic properties of each mineral | Wet f. CaO | Loss on ignition | Blaine specific surface area | Grain size distribution | Residual amount | Color L value | Color a value | Color b value |
| Evaluation data | Data on physical properties of cement-containing hydraulic composite | Compressive strength of mortar | ○ | ○ | ○ | ○ | ○ | ○ | ○ | ○ | ○ | ○ | ○ |
| | | Flexural strength | ○ | ○ | ○ | ○ | ○ | ○ | ○ | ○ | | | |
| | | Fluidity (flow value) | ○ | ○ | ○ | ○ | ○ | ○ | ○ | ○ | ○ | ○ | ○ |
| | | Hydration heat | ○ | ○ | ○ | ○ | ○ | ○ | ○ | ○ | | | |
| | | Setting time period | ○ | ○ | ○ | ○ | ○ | ○ | ○ | ○ | | | |
| | | Drying shrinkage rate | | | | | | | | | | | |
| | | Stability | ○ | ○ | ○ | ○ | ○ | ○ | ○ | | | | |
| | | Expansion in water | ○ | ○ | ○ | ○ | ○ | ○ | ○ | | | | |
| | | Sulfate resistance | ○ | ○ | ○ | ○ | ○ | ○ | ○ | | | | |
| | | Carbonation | ○ | ○ | ○ | ○ | ○ | ○ | ○ | | | | |
| | | ASR resistance | ○ | ○ | ○ | ○ | ○ | ○ | ○ | | | | |

[1] A flow rate of gas in a preheater (one showing a correlation with a preheater temperature)
[2] A lattice constant, a crystallite size, or the like Cement targeted by the method of predicting quality or manufacturing conditions of cement of the present invention is not particularly limited, and examples of the cement include: various portland cements such as ordinary portland cement, high-early-strength portland cement, moderate heat portland cement, and low heat portland cement; various blended cements such as portland blast-furnace slag cement and portland fly-ash cement; and cement obtained by adding an admixture such as limestone powder or silica fume to portland cement.

The manufacturing steps for portland cement are roughly divided into three steps of a raw material preparing step, a burning step, and a finishing step. The raw material preparing step is a step of blending raw materials for cement at an appropriate ratio, such as limestone, clay, silica stone, and an iron oxide raw material, followed by fine grinding with a raw material mill, to thereby obtain a raw material mixture. The burning step is a step of supplying the raw material mixture to a rotary kiln through a suspension preheater or the like and sufficiently burning the raw material mixture, followed by cooling, to thereby obtain clinker. The finishing step is a step of adding an appropriate amount of gypsum or the like to the clinker, followed by fine grinding with a cement mill, to thereby obtain portland cement.

In the present invention, it is preferred to collect a sample for the observation data from the following places.

The clinker is preferably collected from a portion which is as close as possible to a kiln outlet of a kiln and in which the clinker is sufficiently cooled (generally, from a middle portion of a clinker cooler). It should be noted that, with a view to capturing average quality data of clinker, a typical sample is preferably obtained by collecting 1 kg or more of the clinker and dividing the clinker. The cement is preferably sampled from an outlet of a cement mill. It should be noted that, with a view to avoiding weathering of cement, the analysis is preferably conducted as soon as possible after the sampling.

In order to capture a variation in the evaluation data, a collection interval for the sample for the observation data is preferably as short as possible. However, a shorter collection interval results in increased labor or the like. Therefore, in practical use, the collection interval is preferably from 15 minutes to 1 hour.

In the present invention, the manufacturing conditions of cement can be optimized based on an estimated value of the evaluation data (for example, setting time period) obtained by artificially varying a value of the observation data (for example, mineral composition of cement).

In the present invention, the relationship between the observation data in cement manufacturing and the evaluation data related to the evaluation of the quality or manufacturing conditions of cement is learned in advance by the neural network, and the evaluation data is predicted based on only the observation data through use of the learning result.

FIG. 1 illustrates an example of a learning method for a neural network.

The learning method for a neural network is hereinafter described in detail.

[Step (A)]

In Step (A), the initial setting of the number of times of learning is performed. The number of times of learning to be set is not particularly limited and is preferably a sufficiently large number of times to such a degree that overlearning of the neural network occurs. Specifically, the number of times of learning is generally 5,000 to 1,000,000, preferably 10,000 to 100,000.

In Step (A), it is preferred that the number of times of learning by which overlearning of the neural network occurs, specifically, the number of times of learning such that $\sigma_L < \sigma_M$ (described later in detail) is obtained, be set. However, the number of times of learning is increased or decreased in a later step, and hence no problems arise even when the number of times of learning that is generally used for learning of a neural network is used as the number of times of learning to be set initially in Step (A).

After the completion of Step (A), Step (B) is performed.

[Step (B)]

In Step (B), the learning of the neural network is performed for the set number of times of learning through use of a plurality of combinations of an actually measured value of observation data and an actually measured value of evaluation data for learning (hereinafter also referred to as "learning data"). The number of the combinations is, for example, 10 or more. There is no particular limit to the upper limit of the number of the combinations and is for example 1,000.

Specifically, a plurality of samples for learning are prepared, and actually measured values of observation data of the samples and actually measured values of intended evaluation data are measured and used as learning data. Of the learning data, the actually measured value of the observation data is input to the input layer of the neural network, and an estimated value of the evaluation data is output from the output layer. An actually measured value of the evaluation data of the learning data corresponding to the estimated value of the evaluation data is obtained. The learning of the neural network is performed by comparing and evaluating the estimated value and the actually measured value of the evaluation data to correct the neural network for the set number of times of learning.

It should be noted that, when neural network relearning is performed by changing the number of times of learning, the neural network obtained as a result of the previous learning is initialized, and learning is performed again.

After the completion of Step (B), Step (C) is performed.

[Step (C)]

In Step (C), $\sigma_L$ and $\sigma_M$ are calculated. From the magnitude correlation of $\sigma_L$ and $\sigma M$, it can be determined whether or not learning has been performed for a sufficiently large number of times to such a degree that overlearning of a neural network occurs.

Specifically, a mean square error ($\sigma_L$) is calculated between the estimated value of the evaluation data obtained by inputting the actually measured value of the observation data of the learning data to the input layer of the neural network in which learning has been performed in the latest Step (B), and the actually measured value of the evaluation data of the learning data. Then, a mean square error ($\sigma_M$) is calculated between the estimated value of the evaluation data obtained by inputting the actually measured value of the observation data of monitor data to the input layer of the neural network in which learning has been performed in the latest Step (B), and the actually measured value of the evaluation data of the monitor data. After that, the calculated numerical values $\sigma_L$ and $\sigma_M$ are compared with each other, to thereby determine whether or not the learning of the neural network has been performed for a sufficiently large number of times.

Here, the monitor data refers to a combination of an actually measured value of the observation data and an actually measured value of the evaluation data, which are obtained from a sample different from the sample used for obtaining the learning data, and encompasses data for confirming the reliability of the neural network.

The number of the monitor data (i.e. combinations of the actually measured value of the observation data and the actually measured value of the evaluation data) is preferably from 5% to 50%, more preferably from 10% to 30% of the number of the learning data.

In the case where $\sigma_L$ and $\sigma_M$ calculated in Step (C) satisfy the relationship of $\sigma_L \geq \sigma_M$ (see "No" in the overlearning determination of FIG. 1), it can be determined that the number of times of learning in Step (B) performed most recently is not a sufficiently large number of times. In this case, Step (D) is performed. In the case where $\sigma_L$ and $\sigma_M$ calculated in Step (C) satisfy the relationship of $\sigma_L < \sigma_M$ (see "Yes" in the overlearning determination of FIG. 1), it can be determined that the number of times of learning in Step (B) performed most recently is a sufficiently large number of times. In this case, Step (E) is performed.

[Step (D)]

In Step (D), the set number of times of learning is increased to reset the increased number of times of learning as a new number of times of learning (for example, the number obtained by multiplying the number of times of learning performed in the latest Step (B) by 2.0 is set as a new number of times of learning). After the new number of times of learning is reset, Steps (B) and (C) are performed again.

[Step (E)]

In step (E), the number of times of learning obtained by reducing the number of times of learning performed in the latest learning of the neural network is reset as a new number of times of learning (for example, the number obtained by multiplying the number of times of learning performed in the latest Step (B) or Step (F) by 0.95 is set as a new number of times of learning).

It should be noted that, the latest learning of the neural network refers to learning performed in the closest past. Specifically, the latest learning of the neural network refers to learning performed in the closer past of Step (B) or Step (F) described later.

After the completion of Step (E), Step (F) is performed.

[Step (F)]

In Step (F), the learning of the neural network is performed for the set number of times of learning through use of a plurality of learning data used in Step (B).

The above-mentioned number of times of learning corresponds to the number of times of learning newly set in the latest Step (E). The content performed in Step (F) is the same as that in Step (B) except that the learning of the neural network is performed for the newly set number of times of learning in Step (E).

After the completion of Step (F), Step (G) is performed.

[Step (G)]

In Step (G), the determination of end is performed through use of the neural network obtained in the latest Step (F). Specifically, a mean square error $(\sigma_L)$ is calculated between the estimated value of the evaluation data obtained by inputting the actually measured value of the observation data of the learning data to the input layer of the neural network in which learning has been performed in the latest Step (F), and the actually measured value of the evaluation data of the learning data. A mean square error $(\sigma_M)$ is calculated between the estimated value of the evaluation data obtained by inputting the actually measured value of the observation data in the monitor data to the input layer of the neural network in which learning has been performed in the latest Step (F), and the actually measured value of the evaluation data of the monitor data. In the case where the calculated $\sigma_L$ and $\sigma_M$ satisfy the relationship of $\sigma_L \geq \sigma_M$ (see "Yes" in the determination of end of FIG. 1), it can be determined that the number of times of learning in Step (F) performed most recently is not a sufficiently large number of times any more. In this case, Step (I) described later is performed. In the case where the calculated $\sigma_L$ and $\sigma_M$ satisfy the relationship of $\sigma_L < \sigma_M$ (see "No" in the determination of end of FIG. 1), it can be determined that the number of times of learning in Step (F) performed most recently is still a sufficiently large number of times. In this case, Step (H) described later is performed.

[Step (H)]

In Step (H), it is determined whether or not the number of times of learning of the neural network in Step (F) performed most recently exceeds a preset numerical value. Step (H) is performed in order to avoid repeating Steps (E) to (G) infinitely. In the case where the number of times of learning of the neural network in Step (F) performed most recently exceeds the preset numerical value in Step (H) (see "Yes" in FIG. 1), Steps (E) to (G) are performed again. In the case where the number of times of learning in Step (F) performed most recently is equal to or less than the preset numerical value in Step (H) (see "No" in FIG. 1), Step (J) or (K) described later is performed.

It should be noted that, the above-mentioned preset numerical value is not particularly limited, and may be, for example, a numerical value of one hundredth of the number of times of learning set in Step (E), or 1 or less or 0 or less.

[Step (I)]

In Step (I), an analysis degree can be determined based on whether or not a judgment value for analysis degree is less than a preset value. The analysis degree determination value is calculated by the following equation (1).

$$\text{Analysis degree determination value (\%)} = \frac{\text{Mean square error } (\sigma_L) \text{ of learning data}}{\text{Average value of estimated value of evaluation data}} \times 100 \quad (1)$$

In the equation (1), the mean square error $(\sigma_L)$ of the learning data is the same as the mean square error $(\sigma_L)$ calculated in the latest Step (G). The average value of the estimated value of the evaluation data represents an average value of an estimated value of the evaluation data obtained by inputting an actually measured value of the observation data of the learning data to the input layer of the neural network obtained in the latest Step (F).

It can be determined whether or not the quality or the like of cement can be predicted with high accuracy through use of the neural network in which learning has been performed by performing the analysis degree determination.

When the analysis degree determination value is less than the preset value (see "Yes" in the analysis degree determination of FIG. 1), it is determined that the analysis is sufficient, and the learning of the neural network is ended. The obtained learned neural network is used for the prediction method of the present invention. When the analysis degree determination value is equal to or more than the preset value (see "No" in the analysis degree determination of FIG. 1), it is determined that the quality or the like of cement cannot be predicted with high accuracy through use of the neural network in which learning has been performed through use of learning data. Therefore, Step (J) or (K) is performed.

The preset value is not particularly limited, and is preferably a value of 6% or less, more preferably 5% or less, particularly preferably 3% or less.

[Step (J)]

In order to prevent Steps (A) to (I) from being performed infinitely, Step (J) of determining the number of times for which Step (A) has been performed may be provided before Step (K) described later. The determination of the number of times is to determine whether or not the number of times for which Step (A) has been performed exceeds the preset number of times. For example, in the case where the number of times for which Step (A) has been performed exceeds the preset number of times (for example, 5) ("Yes" in the determination of the number of times of FIG. 1), it is determined that the analysis from the used learning data cannot be performed, and the learning of the neural network is ended. In the case where the number of times for which Step (A) has been performed is equal to or less than the preset number of times, Step (K) is performed.

[Step (K)]

In Step (K), the learning conditions are initialized.

Examples of a method of initializing the learning conditions include a method involving randomly changing threshold values of units forming the neural network and the weight for connecting the units and re-inputting learning data, and a method involving increasing the number of samples for obtaining learning data, increasing the kind of the observation data to be used, or excluding unsuitable learning data, and inputting new learning data.

After the learning conditions are initialized, Steps (A) to (K) are performed again.

The quality or manufacturing conditions of cement can be predicted with higher accuracy by using a learned neural network obtained through Steps (A) to (K), satisfying the conditions of overlearning determination and analysis degree determination.

In the present invention, the learning of the neural network involves initially performing learning for a sufficiently large number of times of learning (number of times of learning such that $\sigma_L < \sigma_M$ is obtained) and thereafter repeating the learning of the neural network until $\sigma_L \geq \sigma_M$ is obtained while reducing the number of times of learning. According to this method, even in the case where there is a variation in the numerical values of $\sigma_L$ and $\sigma_M$ caused by factors such as lacking of evaluation data in learning data, the variation can be corrected, and the learning of the neural network can be performed suitably.

In order for the neural network to perform prediction with higher accuracy, it is preferred that a degree of a difference be checked periodically between the estimated value of the evaluation data and the actually measured value corresponding to the estimated value, and the neural network be updated based on the check result. The frequency of the update is preferably once an hour, more preferably every thirty minutes in the combination (i) (neural network regarding the prediction of a clinker mineral composition, etc.). In the combination (ii) (neural network regarding the prediction of physical properties of cement-containing hydraulic composite), the frequency of update is preferably once a month, more preferably once a week, particularly preferably once a day.

According to the method of predicting the quality or manufacturing conditions of cement of the present invention, estimated values of evaluation data such as the mineral composition of clinker and the compressive strength of a cement-containing hydraulic composite (for example, mortar) can be obtained within one hour merely by inputting observation data through use of the neural network.

Further, cement of appropriate quality can be manufactured by finding the abnormality of the quality of cement in the course of cement manufacturing in an early stage based on the obtained estimated value of the evaluation data, and optimizing various conditions in a raw material preparation step, a burning step, and a finishing step.

Specifically, in the case where abnormality is recognized in an estimated value of a mineral composition of clinker, the mineral composition of clinker can be set to be an intended one by formulating raw materials, adjusting the burning conditions, and the like.

Further, the target for manufacturing can also be corrected based on the estimated value of the evaluation data.

For example, in the case where it is predicted that the compressive strength of mortar will not reach a target value, the quality of cement can be set to be an intended one by analyzing the relationship between the observation data (factor) used for learning and the compressive strength of mortar and confirming the optimum formulation of cement.

Further, a control system for artificially varying the observation data based on the evaluation data can be automated by connecting a computer for controlling cement manufacturing to a computer to be used for performing the method of predicting the quality or manufacturing conditions of cement of the present invention.

In the present invention, as software for performing an operation by the neural network, for example, there is given "Neural Network Library" (trade name) manufactured by OLSOFT LLC.

EXAMPLES

The present invention is hereinafter described by way of Examples.

A. Prediction of Data on Physical Properties of Cement-Containing Hydraulic Composite Example 1

As samples for learning, 28 cements sampled at different time points were each kneaded in accordance with "JIS R 5201," and the compressive strength of each mortar was measured after curing for 3 days, curing for 7 days, and curing for 28 days. The measured values were taken as learning data (i.e. actually measured values of evaluation data).

In addition, for the 28 cements, the Blaine specific surface area, 32 μm sieve residual amount, free lime content determined by wet analysis, amount of each mineral, chemical composition (MgO, $SO_3$, $Na_2O$, $K_2O$, and $P_2O_5$), kiln outlet temperature of a kiln, and cooler temperature were measured, and taken as learning data (i.e. actually measured values of observation data). It should be noted that the amount of each mineral refers to the amount of $C_3S$, $C_2S$, $C_4AF$, CIA, gypsums, or calcite, obtained through measurement with an X-ray powder diffractometer in the measurement range of $2\theta=10$ to $65°$ and through calculation using Rietveld refinement software (it should be noted that the amount of each mineral is used with the same meaning in Examples to be described later).

Further, as samples for monitor, two cements each sampled at a time point different from those of the 28 cements were used, and the compressive strength of each mortar was measured after curing for 3 days, curing for 7 days, and curing for 28 days in the same manner as those for the learning data. The measured values were taken as monitor data (actually measured values of evaluation data). In addition, for the two cements, the Blaine specific surface area, 32 µm sieve residual amount, free lime content determined by wet analysis, amount of each mineral, chemical composition (MgO, SO$_3$, Na$_2$O, K$_2$O, and P$_2$O$_5$), kiln outlet temperature of a kiln, and cooler temperature were measured in the same manner as those for the monitor data, and taken as learning data (actually measured values of observation data).

Learning of a neural network was performed through use of the above-mentioned learning data.

The learning of the neural network was initially performed 10,000 times through use of the learning data and the monitor data. The mean square errors $\sigma_L$ and $\sigma_M$ were calculated through use of the obtained neural network to find that $\sigma_L$ and o satisfied the relationship of $\sigma_L < \sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of $\sigma_L \geq \sigma_M$.

The above-mentioned learning was performed until the analysis degree determination value became less than 2%.

As the neural network, a hierarchical neural network including an input layer, an intermediate layer, and an output layer was used.

Figure 2:
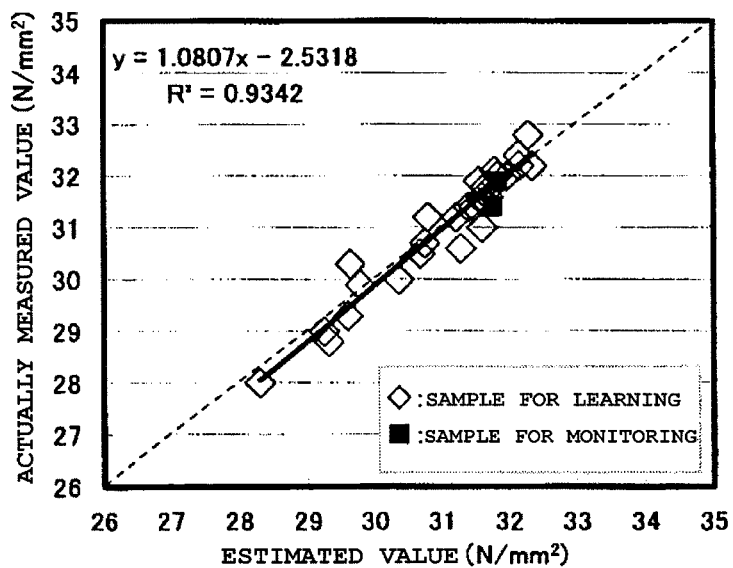
FIG. 2 is a graph showing a comparison between an estimated value predicted in Example 1 and an actually measured value of compressive strength at 3 day material age.
Figure 3:
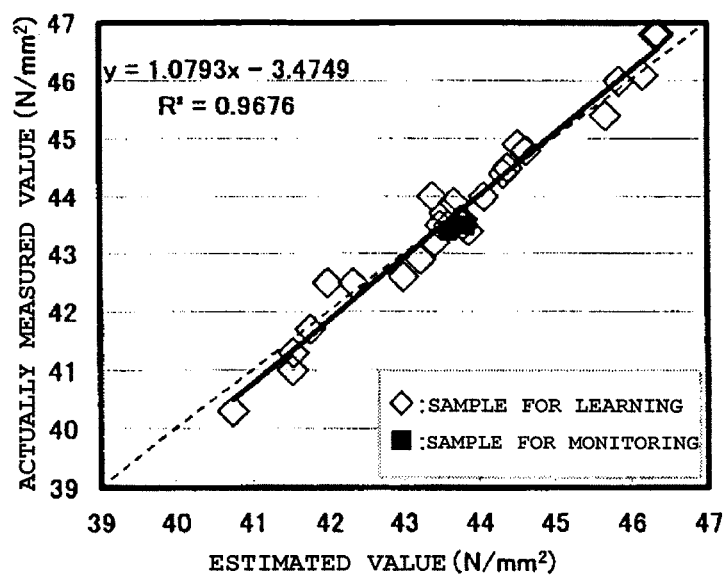
FIG. 3 is a graph showing a comparison between an estimated value predicted in Example 1 and an actually measured value of compressive strength at 7 day material age.
Figure 4:
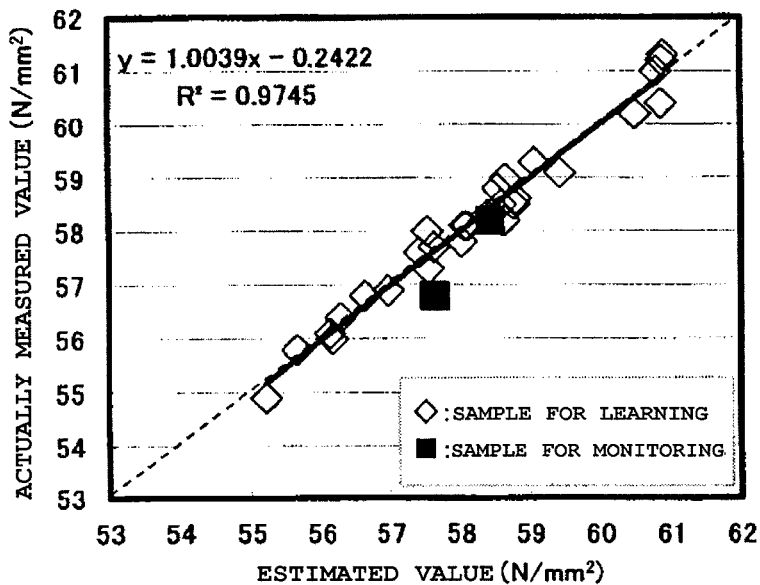
FIG. 4 is a graph showing a comparison between an estimated value predicted in Example 1 and an actually measured value of compressive strength at 28 day material age.

After the learning, the compressive strength of mortar after curing for 3 days, curing for 7 days, and curing for 28 days was predicted based on the actually measured values of the observation data of the learning data and the monitor data. FIGS. 2 to 4 show the results.

Cement A different from the samples described above was used to be kneaded in accordance with "JIS R 5201," and then, the compressive strength of mortar was measured after curing for 3 days, curing for 7 days, and curing for 28 days. As a result, it was found that the compressive strength was 32.0 N/mm$^2$ after curing for 3 days, 43.5 N/mm$^2$ after curing for 7 days, and 58.1 N/mm$^2$ after curing for 28 days.

On the other hand, the Blaine specific surface area, 32 µm sieve residual amount, free lime content determined by wet analysis, amount of each mineral, chemical composition (MgO, SO$_3$, Na$_2$O, K$_2$O, and P$_2$O$_5$), and kiln outlet temperature of a kiln, and cooler temperature in the case of the cement A were input into the obtained neural network. The estimated values of the compressive strengths of mortar after curing for 3 days, after curing for 7 days, and after curing for 28 days obtained by the inputting were 31.8 N/mm$^2$, 43.7 N/mm$^2$, and 58.0 N/mm$^2$, respectively. The actually measured values and the estimated values were in almost perfect agreement.

Comparative Example 1

A test for compressive strength of mortar was conducted in conformity to a method described in Examples of JP 2005-214891 A.

Specifically, clinkers obtained in Example 1 as sample data were collected and divided, followed by fine grinding with a vibration mill, to produce samples for X-ray powder diffraction.

The produced samples were subjected to measurement with an X-ray powder diffractometer in the measurement range of 2θ=10 to 65°.

The obtained X-ray diffraction profile was subjected to calculation using Rietveld refinement software, and thus, parameters on crystal information for each clinker mineral were obtained.

Of those parameters obtained through the analysis, the amount of each mineral, lattice constant (a, b, c, β, or the like), or lattice volume was used to capture changes in the crystal information for each clinker mineral caused by a component contained in a minor or trace amount, and the quality of cement was predicted using a multiple regression equation determined through multiple regression analysis.

As the quality of cement, a preferred example of the multiple regression equation to be used for prediction of the compressive strength of mortar is described below.

Compressive strength of mortar (material age of 3 days)(N/mm$^2$)=$A$×(amount of alite; mass %)+$B$×(amount of aluminate phase; mass %)+$C$×(lattice volume of alite; Å$^3$)+$D$×(amount of alkali sulfate; mass %)+$E$ In the equation, the coefficients A to E are as follows: A=0.6; B=0.3; C=0.6; D=2; and E=60.

Compressive strength of mortar (material age of 7 days)(N/mm$^2$)=a predicted value in the case of the material age of 3 days+$A$×(lattice volume of alite; Å$^3$)+$B$×(amount of alkali sulfate; mass %)+$C$ In the equation, the coefficients A to C are as follows: A=−1; B=−80; and C=32.

Compressive strength of mortar (material age of 28 days)(N/mm$^2$)=a predicted value in the case of the material age of 7 days+$A$×(lattice volume of alite; Å$^3$)+$B$×(amount of belite; mass %)+$C$×(lattice volume of belite; Å$^3$)+$D$×(amount of alkali sulfate; mass %)+$E$×(amount of ferrite phase; mass %)+$F$×(lattice volume of ferrite phase; Å$^3$)+$G$ In the equation, the coefficients A to G are as follows: A=−2; B=4; C=0.6; D=−80; E=−0.2; F=−2; and G=47.

Figure 5:
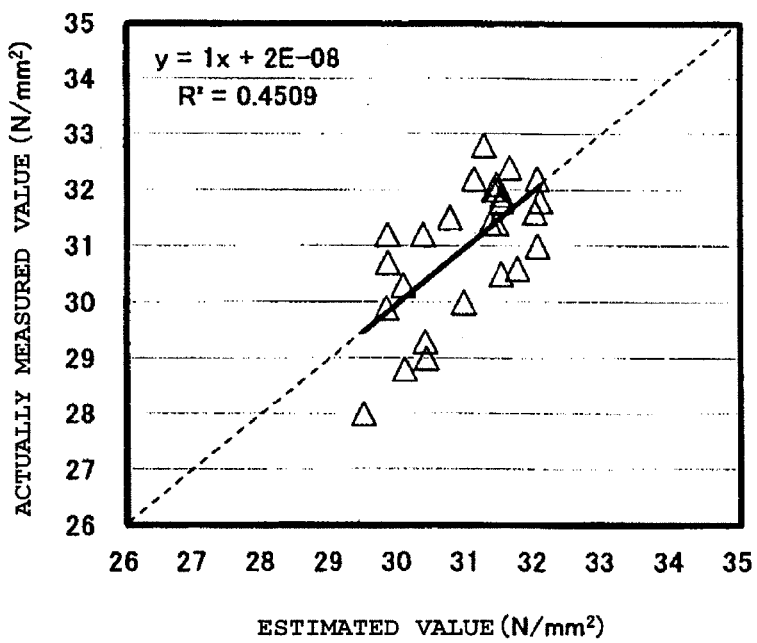
FIG. 5 is a graph showing a comparison between an estimated value predicted in Comparative Example 1 and an actually measured value of compressive strength at 3 day material age.
Figure 6:
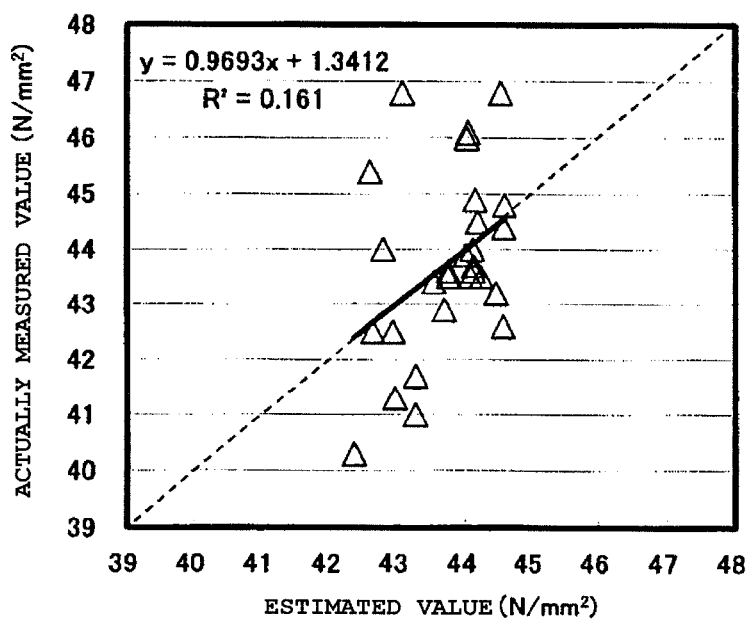
FIG. 6 is a graph showing a comparison between an estimated value predicted in Comparative Example 1 and an actually measured value of compressive strength at 7 day material age.
Figure 7:
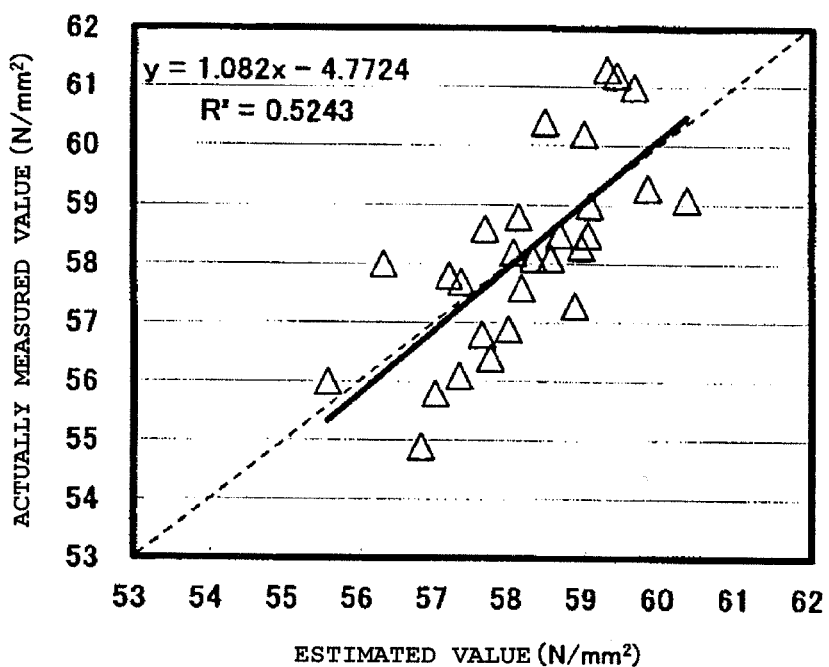
FIG. 7 is a graph showing a comparison between an estimated value predicted in Comparative Example 1 and an actually measured value of compressive strength at 28 day material age.

FIGS. 5 to 7 show graphs of the estimated values and the actually measured values for the compressive strength of mortar in the cases of material ages of 3 days, 7 days, and 28 days, respectively.

FIGS. 5 to 7 reveal that, in the method of JP 2005-214891 A, correlation coefficients (R$^2$) between the estimated values and the actually measured values are low, and an estimated value is likely to be provided with low accuracy.

Comparative Example 2

Learning of a neural network was performed through use of the learning data and the monitor data used in Example 1.

In the learning of the neural network, the number of times of learning was successively increased from one until $\sigma_L$ and $\sigma_M$ calculated through use of the neural network after the learning satisfied the relationship of $\sigma_L \geq \sigma_M$. As a result, the relationship of $\sigma_L \geq \sigma_M$ was satisfied in the first learning, and then the learning was ended.

As the neural network, a hierarchical neural network including an input layer, an intermediate layer, and an output layer was used.

Figure 8:
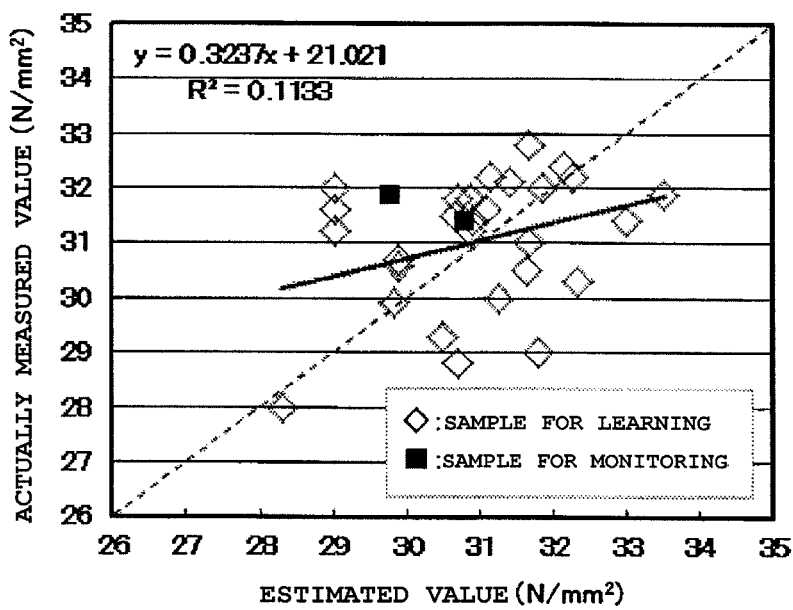
FIG. 8 is a graph showing a comparison between an estimated value predicted in Comparative Example 2 and an actually measured value of compressive strength at 3 day material age.
Figure 9:
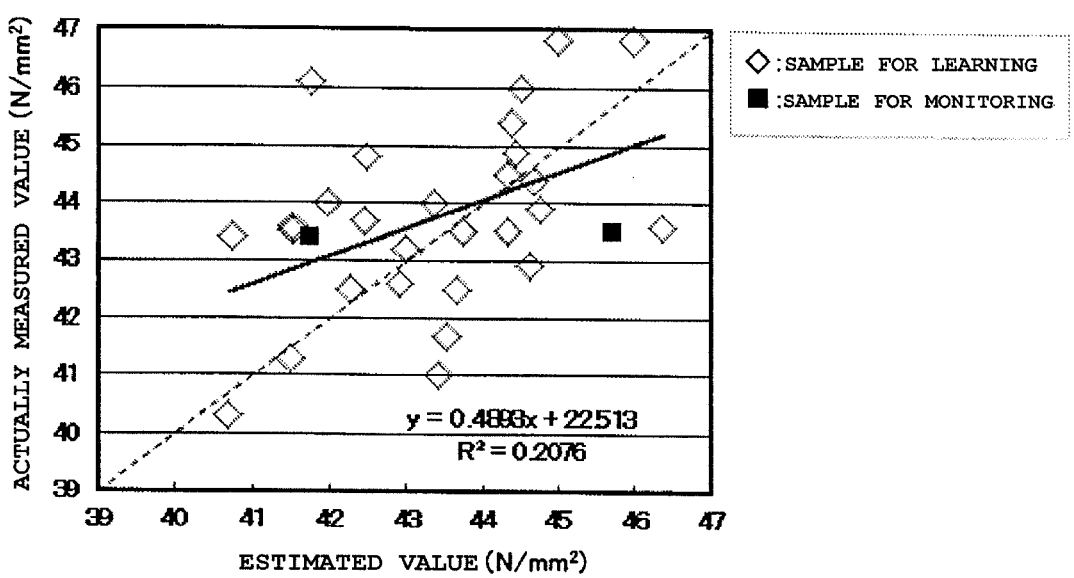
FIG. 9 is a graph showing a comparison between an estimated value predicted in Comparative Example 2 and an actually measured value of compressive strength at 7 day material age.
Figure 10:
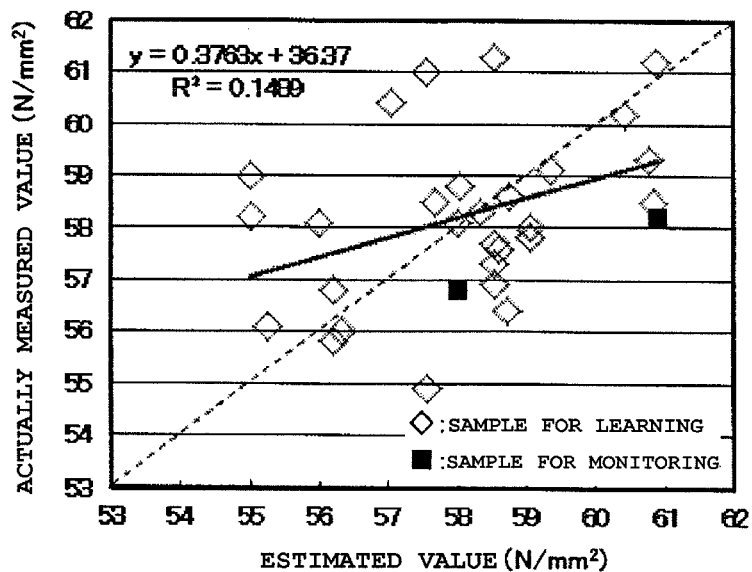
FIG. 10 is a graph showing a comparison between an estimated value predicted in Comparative Example 2 and an actually measured value of compressive strength at 28 day material age.

After the learning, the compressive strength of mortar after curing for 3 days, curing for 7 days, and curing for 28 days was predicted based on the actually measured values of the observation data of the learning data and the monitor data of the monitor data. FIGS. 8 to 10 show the results.

Cement A different from the samples described above was used to be kneaded in accordance with "JIS R 5201," and then, the compressive strength of mortar was measured after curing for 3 days, curing for 7 days, and curing for 28 days. As a result, it was found that the compressive strength was 32.0 N/mm² after 3 curing for days, 43.5 N/mm² after curing for 7 days, and 58.1 N/mm² after curing for 28 days.

On the other hand, the Blaine specific surface area, 32 μm sieve residual amount, free lime content determined by wet analysis, amount of each mineral, chemical composition ($MgO$, $SO_3$, $Na_2O$, $K_2O$, and $P_2O_5$), and kiln outlet temperature of a kiln, and cooler temperature in the case of the cement A were input into the obtained neural network. The estimated values of the compressive strengths of mortar after curing for 3 days, after curing for 7 days, and after curing for 28 days obtained by the inputting were 38.3 N/mm², 48.6 N/mm², and 68.3 N/mm², respectively. There were larger differences between the actually measured values and the estimated values than those in Examples.

Example 2

As samples for learning, 28 cements sampled at different time points were each kneaded in accordance with "JIS R 5201," and the compressive strength of each mortar was measured after curing for 3 days, curing for 7 days, and curing for 28 days. The measured values were taken as learning data (i.e. actually measured values of evaluation data).

In addition, for the 28 cements, the Blaine specific surface area, 32 μm sieve residual amount, free lime content determined by wet analysis, chemical composition ($MgO$, $SO_3$, $Na_2O$, $K_2O$, and $P_2O_5$) supply amount of a main clinker raw material, storage amount (i.e. remaining amount) in a blending silo, and storage amount (i.e. remaining amount) in a raw material storage silo were measured, and taken as learning data (i.e. actually measured values of observation data).

Further, as samples for monitor, two cements each sampled at a time point different from those of the 28 cements were used, and the compressive strength of each mortar was measured after curing for 3 days, curing for 7 days, and curing for 28 days in the same manner as those for the learning data. The measured values were taken as monitor data (i.e. actually measured values of evaluation data). In addition, for the two cements, the Blaine specific surface area, 32 μm sieve residual amount, free lime content determined by wet analysis, chemical composition ($MgO$, $SO_3$, $Na_2O$, $K_2O$, and $P_2O_5$) supply amount of a main clinker raw material, storage amount (i.e. remaining amount) in a blending silo, and storage amount (i.e. remaining amount) in a raw material storage silo were measured in the same manner as those for the monitor data, and taken as learning data (i.e. actually measured values of observation data).

Learning of a neural network was performed through use of the above-mentioned learning data.

The learning of the neural network was initially performed 10,000 times through use of the learning data and the monitor data. The mean square errors $\sigma_L$ and $\sigma_M$ were calculated through use of the obtained neural network to find that $\sigma_L$ and $\sigma_M$ satisfied the relationship of $\sigma_L < \sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of $\sigma_L \geq \sigma_M$.

The above-mentioned learning was performed until the analysis degree determination value became less than 2%.

As the neural network, a hierarchical neural network including an input layer, an intermediate layer, and an output layer was used.

Figure 11:
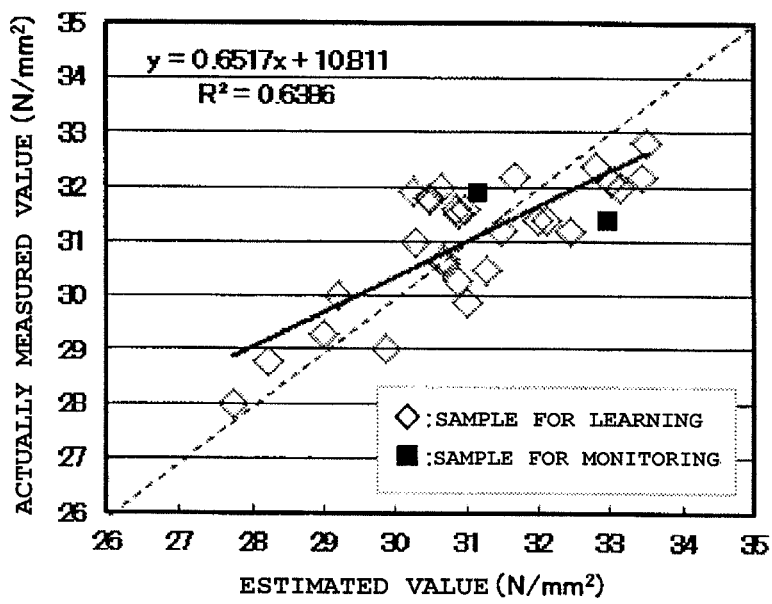
FIG. 11 is a graph showing a comparison between an estimated value predicted in Example 2 and an actually measured value of compressive strength at 3 day material age.
Figure 12:
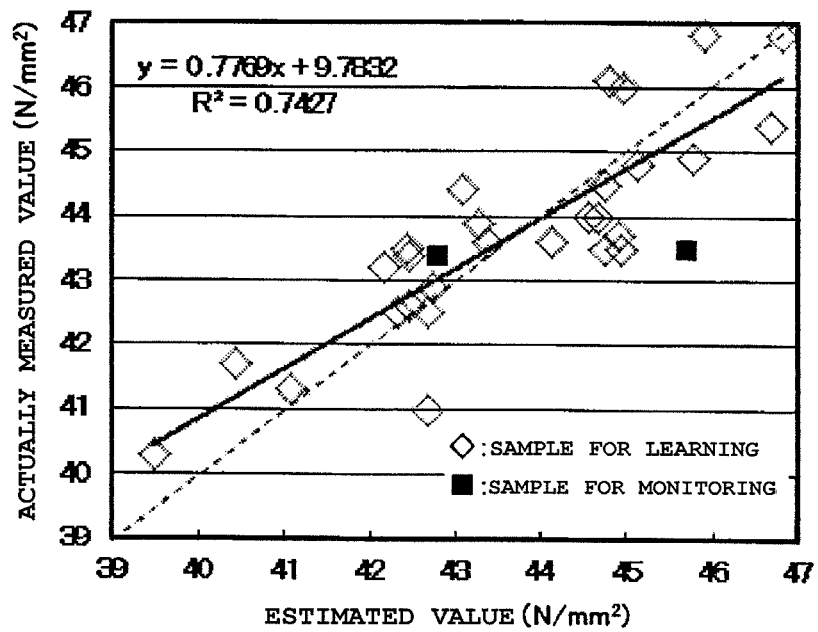
FIG. 12 is a graph showing a comparison between an estimated value predicted in Example 2 and an actually measured value of compressive strength at 7 day material age.
Figure 13:
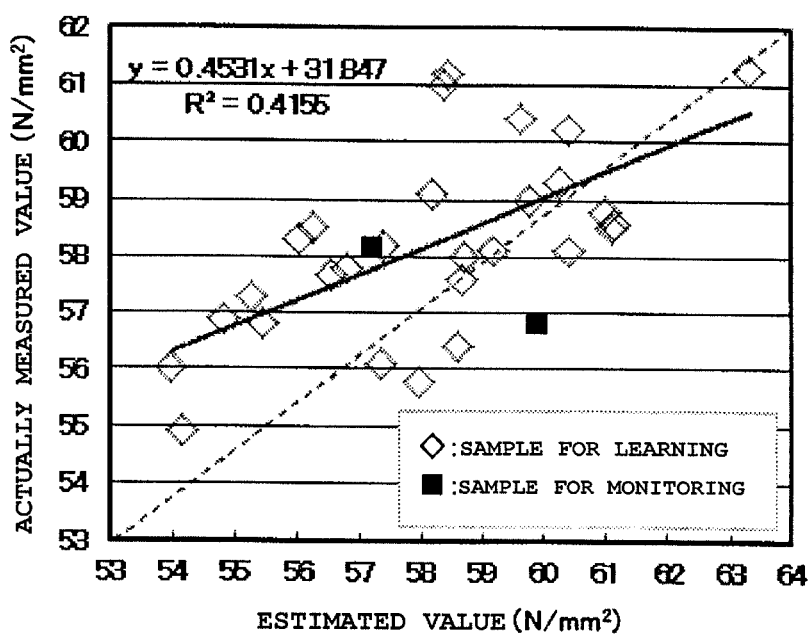
FIG. 13 is a graph showing a comparison between an estimated value predicted in Example 2 and an actually measured value of compressive strength at 28 day material age.

After the learning, the compressive strength of mortar after curing for 3 days, curing for 7 days, and curing for 28 days was predicted based on the actually measured values of the observation data of the learning data and the monitor data of the monitor data. FIGS. 11 to 13 show the results.

Cement A different from the samples described above was used to be kneaded in accordance with "JIS R 5201," and then, the compressive strength of mortar was measured after curing for 3 days, curing for 7 days, and curing for 28 days. As a result, it was found that the compressive strength was 32.0 N/mm² after curing for 3 days, 43.5 N/mm² after curing for 7 days, and 58.1 N/mm² after curing for 28 days.

On the other hand, the Blaine specific surface area, 32 μm sieve residual amount, free lime content determined by wet analysis, amount of each mineral, chemical composition ($MgO$, $SO_3$, $Na_2O$, $K_2O$, and $P_2O_5$), and kiln outlet temperature of a kiln, and cooler temperature in the case of the cement A were input into the obtained neural network. The estimated values of the compressive strengths of mortar after curing for 3 days, after curing for 7 days, and after curing for 28 days obtained by the inputting were 35.2 N/mm², 40.4 N/mm², and 66.0 N/mm², respectively.

Example 3

As samples for learning, 20 cements sampled at different time points were each subjected to a test for fluidity of cement using a high-range water reducing agent (using a slump cone and rod made of steel specified in JIS A 1171-2000, a 500 mm×500 mm acrylic plate, and a spoon and mortar standard sand specified in JIS R 5201-1997). The measured values were taken as learning data (i.e. actually measured values of evaluation data). It should be noted that the measurement of fluidity was conducted immediately after and 30 minutes after kneading.

In addition, for the 20 cements, the Blaine specific surface area, 32 μm sieve residual amount, free lime content determined by wet analysis, amount of each mineral, chemical composition ($MgO$, $SO_3$, $Na_2O$, $K_2O$, and $P_2O_5$), grinding temperature of clinker, and watering amount were measured, and taken as learning data (i.e. actually measured values of observation data). It should be noted that the amount of each mineral was calculated in the same manner as in Example 1.

Further, as samples for monitoring, two cements each sampled at a time point different from those of the 20 samples were used, and the fluidity was measured immediately after and 30 minutes after kneading in the same manner as that for the learning data. The measured values were taken as monitor data (i.e. actually measured values of evaluation data). In addition, for the two cements, the Blaine specific surface area, 32 μm sieve residual amount, free lime content determined by wet analysis, amount of each mineral, chemical composition ($MgO$, $SO_3$, $Na_2O$, $K_2O$, and $P_2O_5$), grinding temperature of clinker, and watering amount were measured in the same manner as those for the learning data, and taken as monitor data (i.e. actually measured values of observation data).

Learning of a neural network was performed through use of the above-mentioned learning data.

The learning of the neural network was initially performed 10,000 times through use of the learning data and the monitor data. The mean square errors $\sigma_L$ and $\sigma_M$ were calculated through use of the obtained neural network to find that $\sigma_L$ and $\sigma_M$ satisfied the relationship of $\sigma_L < \sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of $\sigma_L \geq \sigma_M$.

The above-mentioned learning was performed until the analysis degree determination value became less than 2%.

As the neural network, a hierarchical neural network including an input layer, an intermediate layer, and an output layer was used.

Figure 14:
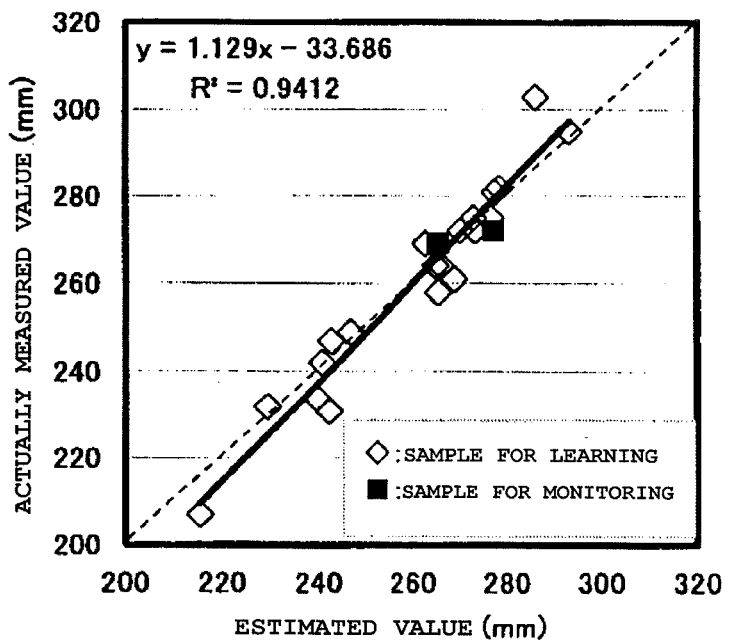
FIG. 14 is a graph showing a comparison between an estimated value predicted in Example 3 and an actually measured value of fluidity immediately after kneading.
Figure 15:
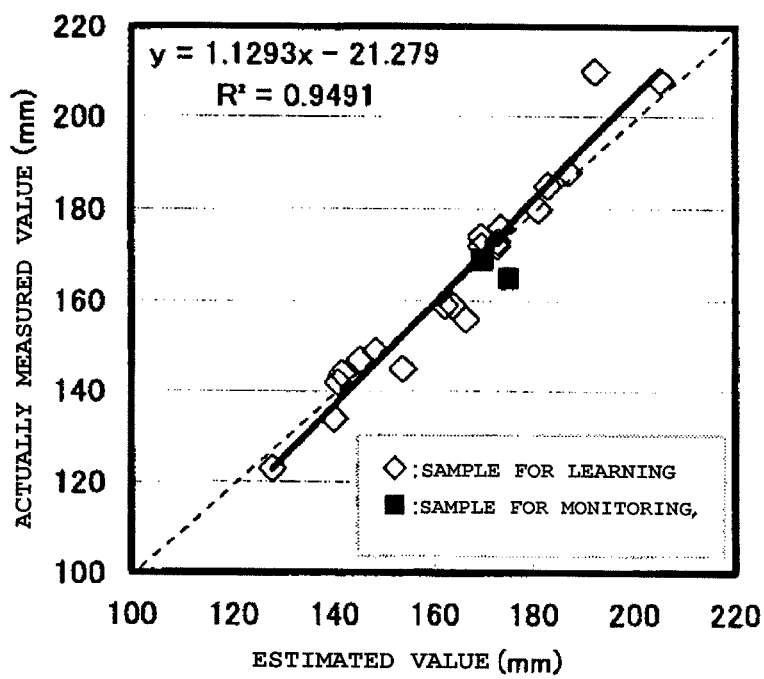
FIG. 15 is a graph showing a comparison between an estimated value predicted in Example 3 and an actually measuredvalue of fluidity 30 minutes after kneading.

After the learning, the fluidity immediately after and 30 minutes after kneading was predicted based on the actually measured values of the observation data of the learning data and the monitor data of the monitor data. FIGS. 14 and 15 show the results.

Cement A different from the samples described above was used to be measured for its fluidity in the same manner as above immediately after kneading. The result was 266 mm.

On the other hand, the Blaine specific surface area, 32 μm sieve residual amount, free lime content determined by wet analysis, amount of each mineral, chemical composition (MgO, $SO_3$, $Na_2O$, $K_2O$, and $P_2O_5$), and kiln outlet temperature of a kiln, and cooler temperature in the case of the cement A were input into the obtained neural network. The fluidity immediately after kneading obtained by the inputting was 263 mm. The actually measured value and the estimated value were in almost perfect agreement.

Example 4

As samples for learning, 22 cements sampled at different time points were each measured for the hydration heat after 7 days and 28 days in accordance with "JIS R 5203." The measured values were taken as learning data (actually measured values of evaluation data).

In addition, for the 22 cements, the Blaine specific surface area, 32 μm sieve residual amount, free lime content determined by wet analysis, amount of each mineral, chemical composition (MgO, $SO_3$, $Na_2O$, $K_2O$, and $P_2O_5$), and kiln outlet temperature of a kiln were measured, and taken as learning data (i.e. actually measured values of observation data). It should be noted that the amount of each mineral was calculated in the same manner as in Example 1.

Further, as samples for monitor, two cements each sampled at a time point different from those of the 22 cements were used, and the hydration heat was measured after 7 days and 28 days in the same manner as those for the learning data. The measured values were taken as monitor data (i.e. actually measured values of evaluation data). In addition, for the two cements, the Blaine specific surface area, 32 μm sieve residual amount, free lime content determined by wet analysis, amount of each mineral, chemical composition (MgO, $SO_3$, $Na_2O$, $K_2O$, and $P_2O_5$), and kiln outlet temperature of a kiln were measured in the same manner as those for the learning data, and taken as monitor data (i.e. actually measured values of observation data).

Learning of a neural network was performed through use of the above-mentioned learning data.

The learning of the neural network was initially performed 10,000 times through use of the learning data and the monitor data. The mean square errors $\sigma_L$ and $\sigma_M$ were calculated through use of the obtained neural network to find that $\sigma_L$ and $\sigma_M$ satisfied the relationship of $\sigma_L < \sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of $\sigma_L \geq \sigma_M$.

The above-mentioned learning was performed until the analysis degree determination value became less than 2%.

As the neural network, a hierarchical neural network including an input layer, an intermediate layer, and an output layer was used.

Figure 16:
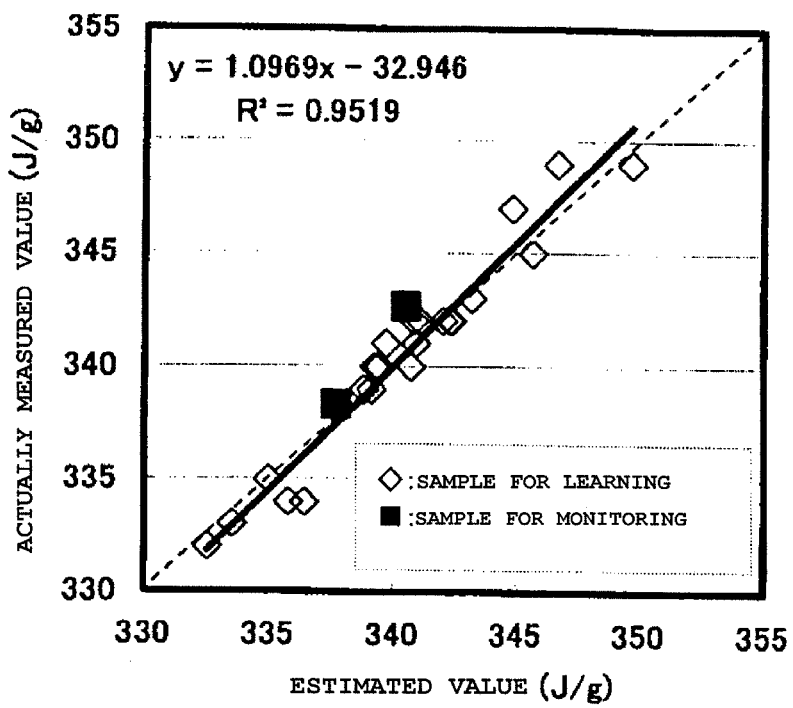
FIG. 16 is a graph showing a comparison between an estimated value predicted in Example 4 and an actually measured value of hydration heat at 7 day material age.
Figure 17:
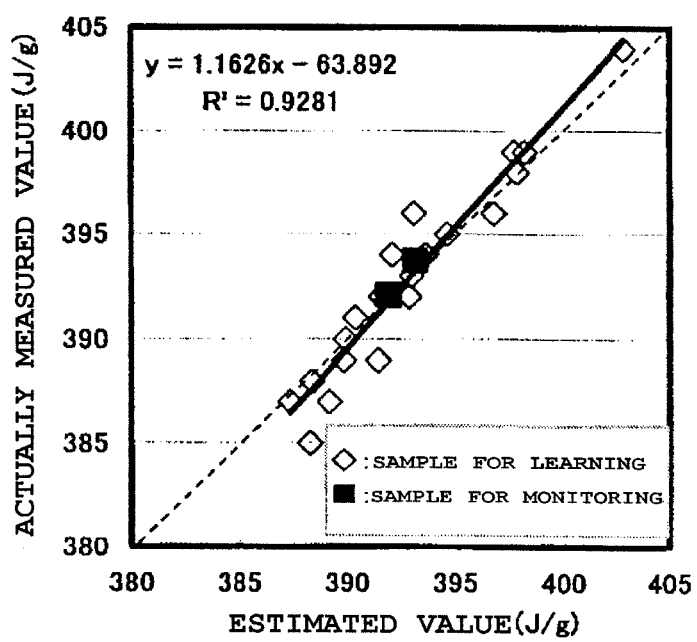
FIG. 17 is a graph showing a comparison between an estimated value predicted in Example 4 and an actually measured value of hydration heat at 28 day material age.

After the learning, the hydration heat after curing for 7 days and curing for 28 days was predicted based on the actually measured values of the observation data of the learning data and the monitor data of the monitor data. FIGS. 16 and 17 show the results.

Example 5

As samples for learning, 20 cements sampled at different time points were each measured for the start and end of the setting time period in accordance with "JIS R 5201". The measured values were taken as learning data (i.e. actually measured values of evaluation data).

In addition, for the 20 cements, the Blaine specific surface area, 32 μm sieve residual amount, free lime content determined by wet analysis, amount of each mineral, chemical composition (MgO, $SO_3$, $Na_2O$, $K_2O$, and $P_2O_5$), and kiln outlet temperature of a kiln were measured, and taken as learning data (i.e. actually measured values of observation data). It should be noted that the amount of each mineral was calculated in the same manner as in Example 1.

Further, as samples for monitor, two cements each sampled at a time point different from those of the 20 cements were used, and the start and end of the setting time period were measured in the same manner as those for the learning data. The measured values were taken as monitor data (i.e. actually measured values of evaluation data). In addition, for the two cements, the Blaine specific surface area, 32 μm sieve residual amount, free lime content determined by wet analysis, amount of each mineral, chemical composition (MgO, $SO_3$, $Na_2O$, $K_2O$, and $P_2O_5$), and kiln outlet temperature of a kiln were measured in the same manner as those for the learning data, and taken as monitor data (i.e. actually measured values of observation data).

Learning of a neural network was performed through use of the above-mentioned learning data.

The learning of the neural network was initially performed 10,000 times through use of the learning data and the monitor data. The mean square errors $\sigma_L$ and $\sigma_M$ were calculated through use of the obtained neural network to find that $\sigma_L$ and $\sigma_M$ satisfied the relationship of $\sigma_L < \sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of $\sigma_L \geq \sigma_M$.

The above-mentioned learning was performed until the analysis degree determination value became less than 2%.

As the neural network, a hierarchical neural network including an input layer, an intermediate layer, and an output layer was used.

Figure 18:
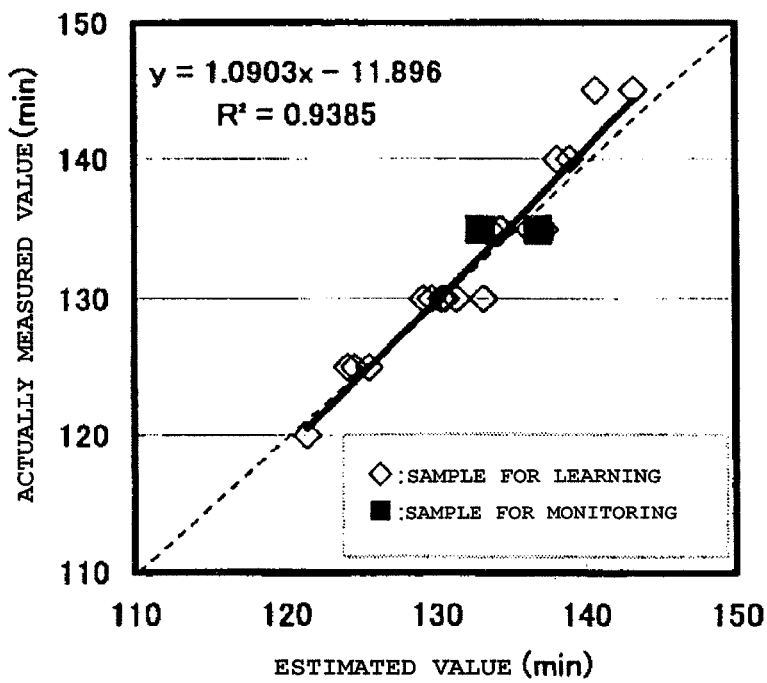
FIG. 18 is a graph showing a comparison between an estimated value predicted in Example 5 and an actually measured value of the start of a setting time period.
Figure 19:
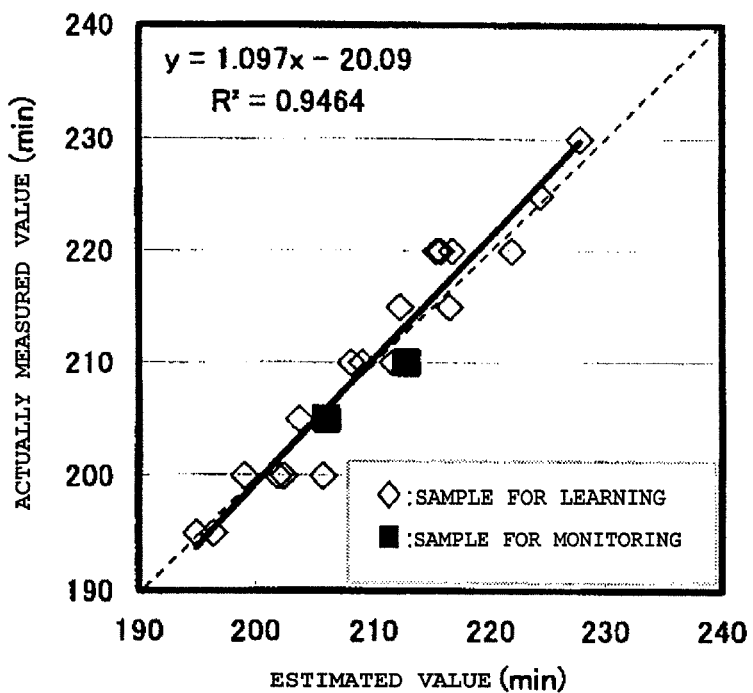
FIG. 19 is a graph showing a comparison between an estimated value predicted in Example 5 and an actually measured value of the end of a setting time period.

After the learning, the setting time period (specifically, start and end) was predicted based on the actually measured values of the observation data of the learning data and the monitor data of the monitor data. FIGS. 18 and 19 show the results.

B. Prediction of Data on Clinker or Cement

Example 6

As samples for learning, 116 clinkers sampled at different time points were each subjected to calculation of the content (%) of free lime (f.CaO) in the clinker based on its mineral composition. The calculated values were taken as learning data (actually measured values of evaluation data). It should be noted that the amount of each mineral was calculated in the same manner as in Example 1.

In addition, for the 116 clinkers, the chemical composition of a clinker raw material immediately before loading into a kiln, bulk density of clinker, kiln outlet temperature of the kiln, burning zone temperature of the kiln, average torque of the kiln, and chemical composition of the clinker were taken as learning data (actually measured values of observation data).

Further, as samples for monitor, five clinkers each sampled at a time point different from those of the 116 clinkers were used, and the contents (%) of free lime (f.CaO) in the clinkers were calculated in the same manner as those for the learning data. The calculated values were taken as monitor data (i.e. actually measured values of evaluation data). In addition, for the five clinkers, the chemical composition of a clinker raw material immediately before loading into a kiln, bulk density of clinker, kiln outlet temperature of the kiln, burning zone temperature of the kiln, average torque of the kiln, and chemical composition of the clinker were taken as monitor data (i.e. actually measured values of observation data).

It should be noted that, in the learning data and the monitor data, the chemical composition of the clinker raw material means the contents of $SiO_2$, $Al_2O_3$, $Fe_2O_3$, CaO, MgO, $SO_3$, $Na_2O$, $K_2O$, $Na_2Oeq$, $TiO_2$, $P_2O_5$, MnO, Cl, T-Cr, Zn, Pb, Cu, Ni, V, As, Zr, Mo, Sr, Ba, and F. The chemical composition of the clinker means the contents of $SiO_2$, $Al_2O_3$, $Fe_2O_3$, CaO, MgO, $SO_3$, $Na_2O$, $K_2O$, $Na_2Oeq$, $TiO_2$, $P_2O_5$, MnO, Cl, T-Cr, Zn, Pb, Cu, Ni, V, As, Zr, Mo, Sr, Ba, and F.

Learning of a neural network was performed through use of the above-mentioned learning data.

The learning of the neural network was initially performed 10,000 times through use of the learning data and the monitor data. The mean square errors $\sigma_L$ and $\sigma_M$ were calculated through use of the obtained neural network to find that $\sigma_L$ and $\sigma_M$ satisfied the relationship of $\sigma_L < \sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of $\sigma_L \geq \sigma_M$.

The above-mentioned learning was performed until the analysis degree determination value became less than 3%.

As the neural network, a hierarchical neural network including an input layer, an intermediate layer, and an output layer was used.

Figure 20:
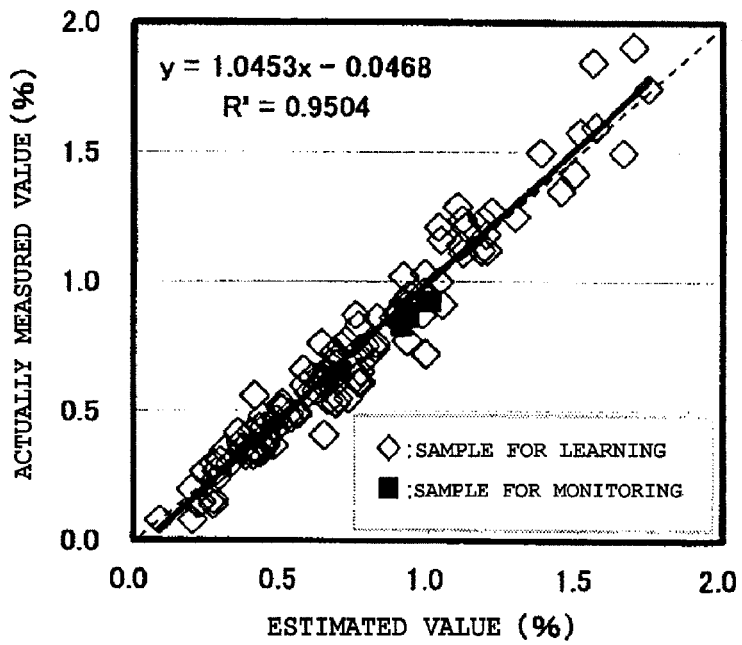
FIG. 20 is a graph showing a comparison between an estimated value predicted in Example 6 and an actually measured value of a content (%) of free lime in clinker.

After the learning, the contents (%) of free lime (f.CaO) in the clinkers were predicted based on the actually measured values of the observation data of the learning data and the monitor data. FIG. 20 shows the results.

Clinker A different from the samples described above was used and the content (%) of free lime (f.CaO) in the clinker was measured in the same manner as above. The result was 0.35%.

On the other hand, the chemical composition of a clinker raw material immediately before loading into a kiln, bulk density of clinker, kiln outlet temperature of the kiln, burning zone temperature of the kiln, average torque of the kiln, and chemical composition of the clinker in the case of the clinker A were input into the obtained neural network. The content (%) of free lime (f.CaO) in the clinker obtained by the inputting was 0.42%. The actually measured value and the estimated value were in almost perfect agreement.

Comparative Example 3

Learning of a neural network was performed through use of the learning data and the monitor data used in Example 5.

In the learning of the neural network, the number of times of learning was successively increased from one until $\sigma_L$ and $\sigma_M$ calculated through use of the neural network after the learning satisfied the relationship of $\sigma_L \geq \sigma_M$. As a result, the relationship of $\sigma_L \geq \sigma_M$ was satisfied in the first learning, and then the learning was ended.

As the neural network, a hierarchical neural network including an input layer, an intermediate layer, and an output layer was used.

Figure 21:
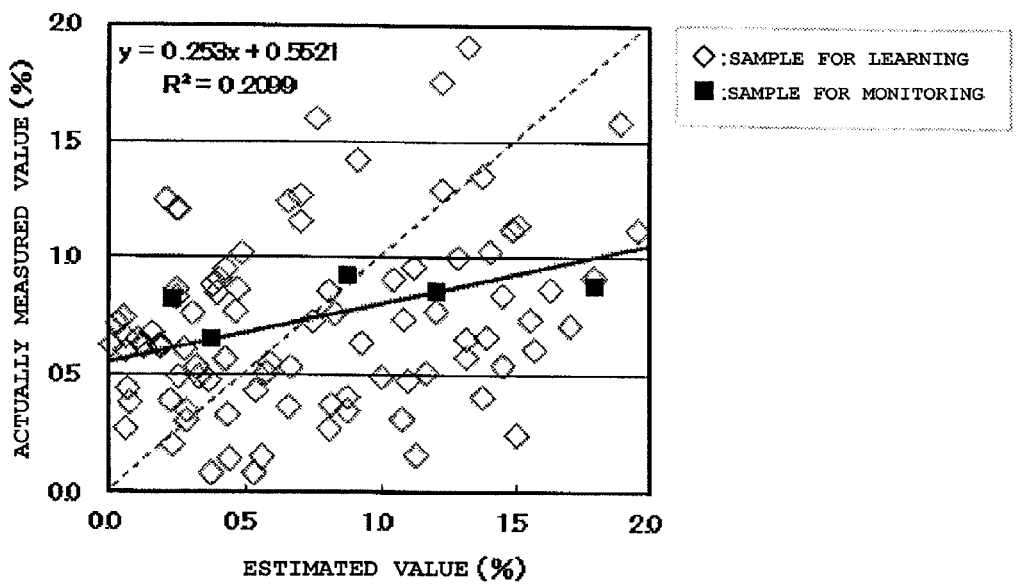
FIG. 21 is a graph showing a comparison between an estimated value predicted in Comparative Example 3 and an actually measured value of a content (%) of free lime in clinker.

After the learning, the contents (%) of free lime (f.CaO) in the clinkers were predicted based on the actually measured values of the observation data of the learning data and the monitor data. FIG. 21 shows the results.

Clinker A different from the samples described above was used and the content (%) of free lime (f.CaO) in the clinker was measured in the same manner as above. The result was 0.35%.

On the other hand, the chemical composition of a clinker raw material immediately before loading into a kiln, bulk density of clinker, kiln outlet temperature of the kiln, burning zone temperature of the kiln, average torque of the kiln, and chemical composition of the clinker in the case of the clinker A were input into the obtained neural network. The content (%) of free lime (f.CaO) in the clinker obtained by the inputting was 1.2%. There was a larger difference between the actually measured value and the estimated value than that in Examples.

Example 7

As samples for learning, 116 clinkers sampled at different time points were each subjected to calculation of the content (%) of free lime (f.CaO) in the clinker based on its mineral composition. The calculated values were taken as learning data (i.e. actually measured values of evaluation data). It should be noted that the amount of each mineral was calculated in the same manner as in Example 1.

In addition, for the 116 clinkers, the chemical composition of a clinker raw material immediately before loading into a kiln, bulk density of clinker, grinding temperature, watering amount, air flow volume of a separator, and average torque of the kiln were taken as learning data (i.e. actually measured values of observation data).

Further, as samples for monitor, five clinkers each sampled at a time point different from those of the 116 clinkers were used, and the contents (%) of free lime (f.CaO) in the clinkers were calculated in the same manner as those for the learning data. The calculated values were taken as monitor data (i.e. actually measured values of evaluation data). In addition, for the five clinkers, the chemical composition of a clinker raw material immediately before loading into a kiln, bulk density of clinker, grinding temperature, watering amount, air flow volume of a separator, and average torque of the kiln were taken as monitor data (i.e. actually measured values of observation data).

It should be noted that in the learning data and the monitor data, the chemical composition of a clinker raw material is the same as that in Example 5.

Learning of a neural network was performed through use of the above-mentioned learning data.

The learning of the neural network was initially performed 10,000 times through use of the learning data and the monitor data. The mean square errors $\sigma_L$ and $\sigma M$ were calculated through use of the obtained neural network to find that $\sigma_L$ and $\sigma_M$ satisfied the relationship of $\sigma_L<\sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of $\sigma_L \geq \sigma_M$.

The above-mentioned learning was performed until the analysis degree determination value became less than 3%.

As the neural network, a hierarchical neural network including an input layer, an intermediate layer, and an output layer was used.

Figure 22:
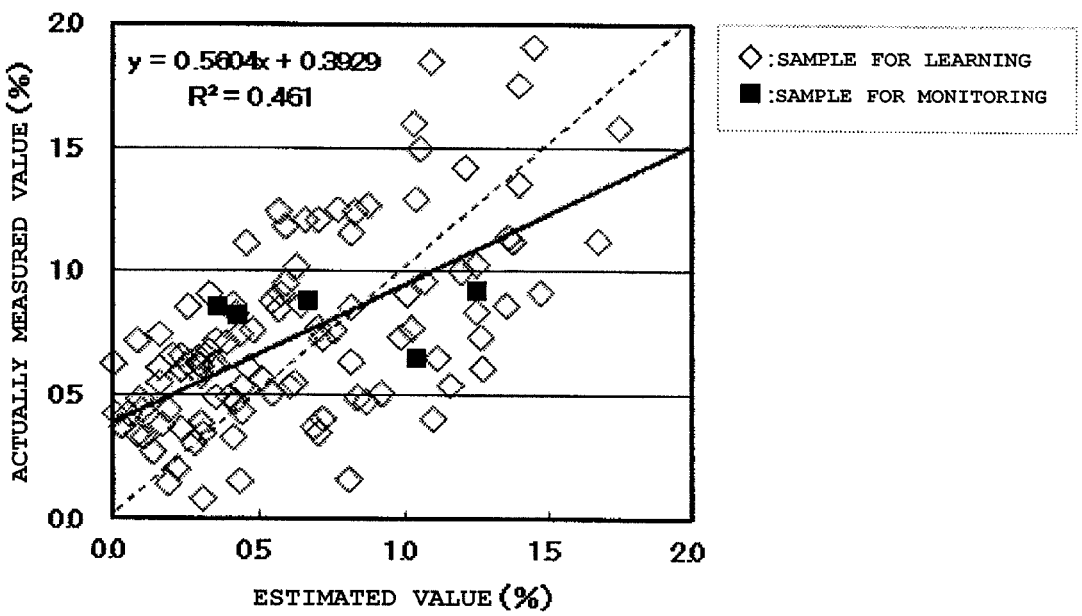
FIG. 22 is a graph showing a comparison between an estimated value predicted in Example 7 and an actually measured value of a content (%) of free lime in clinker.

After the learning, the contents (%) of free lime (f.CaO) in the clinkers were predicted based on the actually measured values of the observation data of the learning data and the monitor data. FIG. 22 shows the results.

Clinker A different from the samples described above was used and the content (%) of free lime (f.CaO) in the clinker was measured in the same manner as above. The result was 0.35%.

On the other hand, the chemical composition of a clinker raw material immediately before loading into a kiln, bulk density of clinker, grinding temperature, watering amount, air flow volume of a separator, and average torque of the kiln in the case of the clinker A were input into the obtained neural network. The content (%) of free lime (f.CaO) in the clinker obtained by the inputting was 0.89%.

Example 8

As samples for learning, 47 cements sampled at different time points were each subjected to calculation of the ratio (%) of hemihydrate gypsum in the cement based on its mineral composition. The calculated values were taken as learning data (actually measured values of evaluation data). It should be noted that the amount of each mineral was calculated in the same manner as in Example 1.

In addition, the loading amount of clinker, bulk density of clinker of the clinker, mineral composition of the clinker, added amount of gypsum, watering amount, rotation number of a mill, and temperature of powder to be discharged from the mill in the cases of the 47 cements were taken as learning data (i.e. actually measured values of observation data).

Further, as samples for monitor, three cements each sampled at a time point different from those of the 47 cements (i.e. samples) were used, and the ratios (%) of hemihydrate gypsum in the cements were calculated. The calculated values were taken as monitor data (i.e. actually measured values of evaluation data). In addition, the loading amount of clinker, bulk density of clinker of the clinker, mineral composition of the clinker, added amount of gypsum, watering amount, rotation number of a mill, and temperature of powder to be discharged from the mill in the cases of the three cements were taken as monitor data (actually measured values of observation data).

Learning of a neural network was performed through use of the above-mentioned learning data.

The learning of the neural network was initially performed 10,000 times through use of the learning data and the monitor data. The mean square errors $\sigma_L$ and $\sigma_M$ were calculated through use of the obtained neural network to find that $\sigma_L$ and $\sigma_M$ satisfied the relationship of $\sigma_L<\sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of $\sigma_L \geq \sigma_M$.

The above-mentioned learning was performed until the analysis degree determination value became less than 3%.

As the neural network, a hierarchical neural network including an input layer, an intermediate layer, and an output layer was used.

Figure 23:
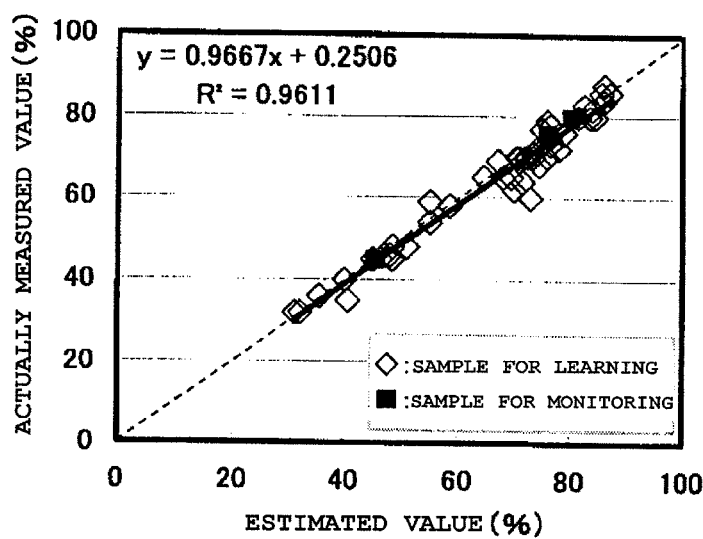
FIG. 23 is a graph showing a comparison between an estimated value predicted in Example 8 and an actually measured value of a ratio (%) of hemihydrate gypsum in cement.

After the learning, the ratios (%) of hemihydrate gypsum in the cements were predicted based on the actually measured values of the observation data of the learning data and the monitor data. FIG. 23 shows the results.

Cement A different from the samples described above was used and the ratio (%) of hemihydrate gypsum in the cement was measured in the same manner as above. The result was 67%.

On the other hand, the loading amount of clinker, bulk density of clinker of the clinker, mineral composition of the clinker, added amount of gypsum, watering amount, rotation number of a mill, and temperature of powder to be discharged from the mill were into the obtained neural network. The ratio (%) of hemihydrate gypsum in the cement obtained by the inputting was 63%. The actually measured value and the estimated value were in almost perfect agreement.

Example 9

As samples for learning, 200 clinkers sampled at different time points were each measured for the amount of each mineral. It should be noted that the amount of each mineral was calculated in the same manner as in Example 1. Based on the results, the ratios of $C_3S/C_2S$ and the ratios of $C_4AF/C_3A$ were actually measured and taken as learning data (i.e. actually measured values of evaluation data).

In addition, the chemical composition of a clinker raw material, burning zone temperature of a kiln, kiln outlet temperature of the kiln, cooler temperature, and the like in the cases of the 200 clinkers were taken as learning data (i.e. actually measured values of observation data). It should be noted that the chemical composition of a clinker raw material refers to the contents of $SiO_2$, $Al_2O_3$, $Fe_2O_3$, CaO, MgO, $SO_3$, $Na_2O$, $K_2O$, $TiO_2$, $P_2O_5$, and MnO.

Further, as samples for monitor, five clinkers each sampled at a time point different from those of the 200 samples were each measured for the amount of each mineral in the same manner as those for the learning data. Based on the results, the ratios of $C_3S/C_2S$ and the ratios of $C_4AF/C_3A$ were actually measured, and taken as monitor data (i.e. actually measured values of evaluation data). In addition, for the five clinkers, the chemical composition of a clinker raw material, burning zone temperature of a kiln, kiln outlet temperature of the kiln, cooler temperature, and the like were measured in the same manner as those for the learning data, and taken as monitor data (i.e. actually measured values of observation data).

Learning of a neural network was performed through use of the above-mentioned learning data.

The learning of the neural network was initially performed 10,000 times through use of the learning data and the monitor data.

The mean square errors $\sigma_L$ and $\sigma_M$ were calculated through use of the obtained neural network to find that $\sigma_L$ and $\sigma_M$ satisfied the relationship of $\sigma_L < \sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of $\sigma_L \geq \sigma_M$.

The above-mentioned learning was performed until the analysis degree determination value became less than 3%.

Figure 24:
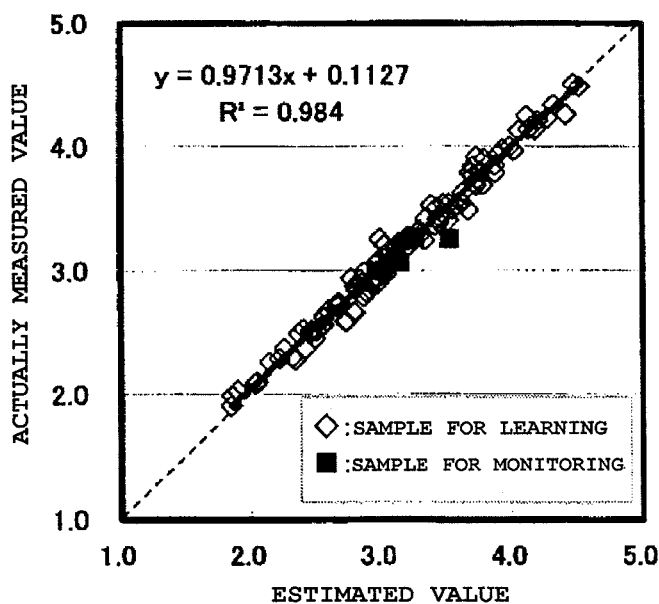
FIG. 24 is a graph showing a comparison between an estimated value predicted in Example 9 and an actually measured value of quality ($C_3S/C_2S$ ratio) of clinker.
Figure 25:
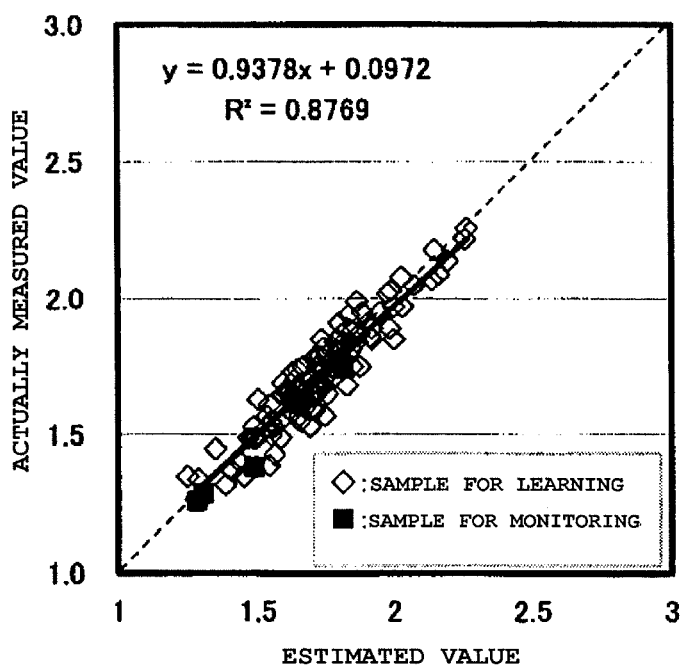
FIG. 25 is a graph showing a comparison between an estimated value predicted in Example 9 and an actually measured value of quality ($C_4AF/C_3A$ ratio) of clinker.

After the learning, the ratios of $C_3S/C_2S$ and the ratios of $C_4AF/C_3A$ were predicted based on the actually measured values of the observation data of the learning data and the monitor data. FIGS. 24 and 25 show the results (i.e. the ratios of $C_3S/C_2S$ and the ratios of $C_4AF/C_3A$, respectively).

Prediction of Data on Clinker Raw Material

Example 10

As samples for learning, 40 clinker raw materials sampled at different time points immediately before loading into a kiln were each subjected to calculation of the hydraulic modulus based on its mineral composition. The calculated values were taken as learning data (i.e. actually measured values of evaluation data). It should be noted that the amount of each mineral was calculated in the same manner as in Example 1.

In addition, the hydraulic modulus of a main clinker raw material (i.e. blended raw material) in a raw material mill at the time points before 3 hours, 4 hours, 5 hours, and 6 hours from the time of sampling, supply amount of the main clinker raw material, respective supply amounts of three kinds of supplementary clinker raw materials (i.e. waste materials), remaining amount in a blending silo, remaining amount in a raw material storage silo, current value of a cyclone located between the raw material mill and the blending silo, flow rate of gas in a preheater, Blaine specific surface area of the clinker raw material (i.e. fineness), and ignition loss of the clinker raw material in the cases of the 40 clinker raw materials were taken as learning data (i.e. actually measured values of observation data).

Further, as samples for monitor, three clinker raw materials each sampled at a time point different from those of the 40 samples were used, and the hydraulic moduli were calculated in the same manner as those for the learning data. The calculated values were taken as monitor data (a i.e. actually measured values of evaluation data). In addition, the hydraulic modulus of a main clinker raw material (i.e. blended raw material) in a raw material mill at the time points before 3 hours, 4 hours, 5 hours, and 6 hours from the time of sampling, supply amount of the main clinker raw material, respective supply amounts of three kinds of supplementary clinker raw materials (waste materials), remaining amount in a blending silo, remaining amount in a raw material storage silo, current value of a cyclone located between the raw material mill and the blending silo, flow rate of gas in a preheater, Blaine specific surface area of the clinker raw material (fineness), and ignition loss of the clinker raw material in the cases of the three clinker raw materials were taken as monitor data (actually measured values of observation data).

Learning of a neural network was performed through use of the above-mentioned learning data.

The learning of the neural network was initially performed 10,000 times through use of the learning data and the monitor data. The mean square errors $\sigma_L$ and $\sigma_M$ were calculated through use of the obtained neural network to find that $\sigma_L$ and $\sigma_M$ satisfied the relationship of $\sigma_L < \sigma_M$.

After that, the neural network was initialized, and the learning of the neural network was performed for the number of times of learning obtained by multiplying the above-mentioned number of times of learning by 0.95 through use of the learning data and the monitor data repeatedly until $\sigma_L$ and $\sigma_M$ calculated through use of the neural network after learning satisfied the relationship of The above-mentioned learning was performed until the analysis degree determination value became less than 3%.

As the neural network, a hierarchical neural network including an intermediate layer was used.

Figure 26:
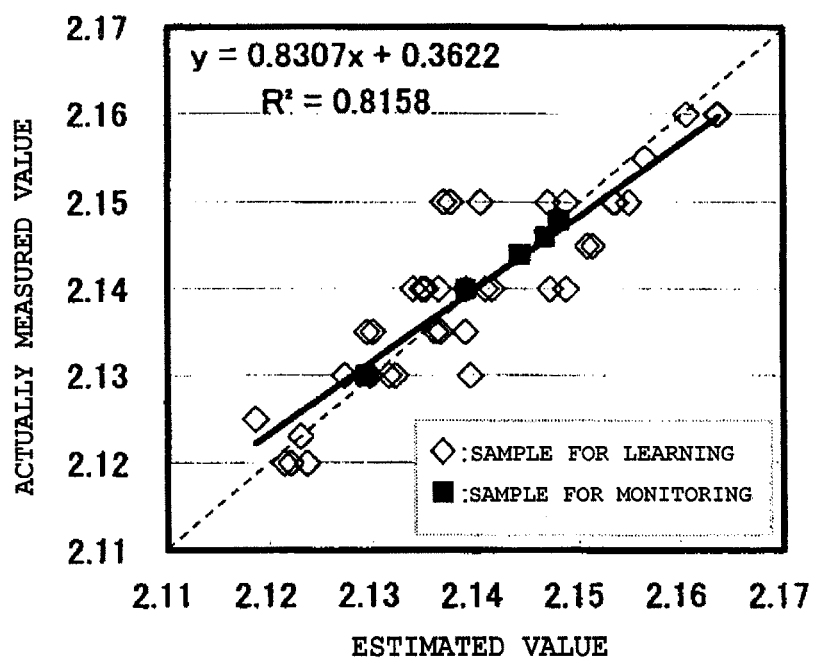
FIG. 26 is a graph showing a comparison between an estimated value predicted in Example 10 and an actually measured value of a hydraulic modulus of a clinker raw material immediately before loading into a kiln.

After the learning, the hydraulic moduli of clinker raw materials immediately before loading into a kiln were predicted based on the actually measured values of the observation data of the learning data and the monitor data. FIG. 26 shows the results.

The invention claimed is:

1. A method of predicting quality or manufacturing conditions of
   cement through use of a neural network including an input layer and an output layer,
   the input layer being used for inputting an actually measured value of observation data in cement manufacturing, and the output layer being used for outputting an estimated value of evaluation data related to evaluation of the quality or the manufacturing conditions of the cement,
   the observation data and the evaluation data being used in one of the following combinations:
   (i) a combination in which the observation data comprises one or more kinds of data selected from data on a clinker raw material, data on burning conditions, data on grinding conditions, and data on clinker, and the evaluation data comprises data on a clinker raw material, data on burning conditions, data on grinding conditions, data on clinker, or data on cement; and
   (ii) a combination in which the observation data comprises one or more kinds of data selected from data on a clinker raw material, data on burning conditions, data on grinding conditions, data on clinker, and data on cement, and the evaluation data comprises data on physical properties of a cement-containing hydraulic composite, the method comprising the steps of:
(A) performing initial setting of a number of times of learning;
(B) performing learning of the neural network for the set number of times of learning through use of a plurality of learning data each comprising a combination of an actually measured value of the observation data and an actually measured value of the evaluation data;
(C) calculating a mean square error ($\sigma_L$) between an estimated value of the evaluation data obtained by inputting an actually measured value of the observation data of the plurality of learning data to the input layer of the neural network in which learning has been performed in the latest step (B) and an actually measured value of the evaluation data of the plurality of learning data, and a mean square error ($\sigma_M$) between an estimated value of the evaluation data obtained by inputting an actually measured value of the observation data in monitor data, which comprise a combination of an actually measured value of the observation data and an actually measured value of the evaluation data and which is used for confirming reliability of a learning result of the neural network, to the input layer of the neural network in which learning has been performed in the latest step (B) and an actually measured value of the evaluation data in the monitor data, performing a step (D) when the calculated $\sigma_L$ and $\sigma_M$ satisfy a relationship of $\sigma_L \geq \sigma_M$, and performing a step (E) when the calculated $\sigma_L$ and $\sigma_M$ satisfy relationship of $\sigma_L < \sigma_M$;
(D) increasing the set number of times of learning to reset the increased set number of times of learning as a new number of times of learning, and performing the steps (B) and (C) again;
(E) resetting a number of times of learning obtained by reducing the number of times of learning for which the latest learning of the neural network has been performed as a new number of times of learning;
(F) performing the learning of the neural network for the set number of times of learning through use of the plurality of learning data used in the step (B);
(G) calculating a mean square error ($\sigma_L$) between an estimated value of the evaluation data obtained by inputting an actually measured value of the observation data of the plurality of learning data to the input layer of the neural network in which learning has been performed in the latest step (F) and an actually measured value of the evaluation data of the plurality of learning data and a mean square error ($\sigma_M$) between an estimated value of the evaluation data obtained by inputting an actually measured value of the observation data in the monitor data to the input layer of the neural network in which learning has been performed in the latest step (F) and an actually measured value of the evaluation data in the monitor data, performing a step (I) when the calculated $\sigma_L$ and $\sigma_M$ satisfy a relationship of $\sigma_L \geq \sigma_M$, and performing a step (H) when the calculated $\sigma_L$ and $\sigma_M$ satisfy a relationship of $\sigma_L < \sigma_M$;
(H) performing the steps (E) to (G) again when the number of times of learning of the neural network in the step (F) performed most recently is more than a preset numerical value, and performing a step (K) when the number of times of learning of the neural network in the step (F) performed most recently is equal to or less than the preset numerical value;
(I) calculating a judgment value for analysis degree by the following equation (1), and when the analysis degree determination value is less than a preset value, inputting an actually measured value of the observation data in the cement manufacturing to the input layer and outputting an estimated value of the evaluation data related to the evaluation of the quality or the manufacturing conditions of the cement from the output layer, and when the analysis degree determination value is equal to or more than the preset value, performing the step (K); and
(K) initializing learning conditions, and performing the steps (A) to (K) again:

$$\text{Analysis degree determination value (\%)} = \frac{\text{Mean square error } (\sigma_L) \text{ of learning data}}{\text{Average value of estimated value of evaluation data}} \times 100 \quad (1)$$

(in the equation (1), the mean square error ($\sigma dL$) of the learning data represents a mean square error ($\sigma_L$) of an estimated value of the evaluation data obtained by inputting an actually measured value of the observation data of the learning data to the input layer of the neural network after learning and an actually measured value of the evaluation data of the learning data, and the average value of the estimated value of the evaluation data represents an average value of an estimated value of the evaluation data obtained by inputting an actually measured value of the observation data of the learning data to the input layer of the neural network after learning).

2. The method of predicting quality or manufacturing conditions of cement according to claim 1, further comprising, before the step (K), a step (J) of determining a number of times for which the step (A) has been performed, and when the number of times is equal to or less than a preset number of times, initializing the learning conditions and performing the steps (A) to (I) again, and when the number of times is more than the preset number of times, ending the learning of the neural network.

3. The method of predicting quality or manufacturing conditions of cement according to claim 1, wherein the preset value of the analysis degree determination value comprises a value equal to or less than 6%.

4. The method of predicting quality or manufacturing conditions of cement according to claim 1, wherein the neural network is a hierarchical neural network comprising an intermediate layer between the input layer and the output layer.

5. The method of predicting quality or manufacturing conditions according to claim 1,
wherein, in the combination of the observation data and the evaluation data, the observation data comprises the data on a clinker raw material, the data on burning conditions, and the data on clinker, and the evaluation data comprises the data on clinker, and
wherein the data on a clinker raw material of the observation data comprises a chemical composition of a clinker raw material, the data on burning conditions of the observation data comprises a kiln outlet temperature of a kiln, a burning zone temperature of the kiln, and average torque of the kiln, the data on clinker of the observation data comprises a chemical composition of clinker and bulk density of clinker, and the data on clinker of the evaluation data comprises a free lime content determined by wet analysis (free lime).

6. The method of predicting quality or manufacturing conditions of cement according to claim 1,
wherein, in the combination of the observation data and the evaluation data, the observation data comprises the data on burning conditions and the data on cement, and the evaluation data comprises the data on physical properties of a cement-containing, hydraulic composite, and
wherein the data on burning conditions of the observation data comprises a kiln outlet temperature of a kiln and a cooler temperature, the data on cement of the observation data comprises a Blaine specific surface area of cement, a residual amount, a free lime content determined by wet analysis, a mineral composition, and a chemical composition, and the data on physical properties of a cement-containing hydraulic composite of the evaluation data comprises compressive strength of mortar.

7. The method of predicting quality or manufacturing conditions of cement according to claim 1, further comprising optimizing the manufacturing conditions of the cement based on the estimated value of the evaluation data obtained by artificially varying the actually measured value of the observation data.

8. The method of predicting quality or manufacturing conditions of cement according to claim 1, further comprising periodically checking a degree of difference between the estimated value of the evaluation data and the actually measured value corresponding to the estimated value, and updating the neural network based on a check result.

* * * * *